United States Patent
Pisz

(10) Patent No.: US 9,760,698 B2
(45) Date of Patent: Sep. 12, 2017

(54) INTEGRATED WEARABLE ARTICLE FOR INTERACTIVE VEHICLE CONTROL SYSTEM

(71) Applicant: Toyota Motor Sales, U.S.A., Inc., Torrance, CA (US)

(72) Inventor: James T. Pisz, Huntington Beach, CA (US)

(73) Assignee: Toyota Motor Sales, U.S.A., Inc., Torrance, CA (US)

(*) Notice: Subject to any disclaimer, the term of this patent is extended or adjusted under 35 U.S.C. 154(b) by 0 days.

(21) Appl. No.: 14/469,041

(22) Filed: Aug. 26, 2014

(65) Prior Publication Data

US 2015/0081169 A1    Mar. 19, 2015

Related U.S. Application Data

(63) Continuation-in-part of application No. 14/180,563, filed on Feb. 14, 2014, and a continuation-in-part of application No. 14/175,862, filed on Feb. 7, 2014.

(60) Provisional application No. 61/878,898, filed on Sep. 17, 2013.

(51) Int. Cl.
```
G06F 21/31      (2013.01)
B60H 1/00       (2006.01)
H04W 4/00       (2009.01)
B60R 25/20      (2013.01)
```

(52) U.S. Cl.
CPC ......... *G06F 21/31* (2013.01); *B60H 1/00657* (2013.01); *B60H 1/00742* (2013.01); *B60R 25/20* (2013.01); *H04W 4/008* (2013.01); *B60K 2350/355* (2013.01); *G06F 2221/2111* (2013.01)

(58) Field of Classification Search
None
See application file for complete search history.

(56) References Cited

U.S. PATENT DOCUMENTS

| | | |
|---|---|---|
| 3,129,862 A | 4/1964 | Cone |
| 3,713,090 A | 1/1973 | Dickinson |
| 4,658,612 A | 4/1987 | Eisermann |
| 4,818,048 A | 4/1989 | Moss |
| 4,942,841 A | 7/1990 | Drucker, Jr. |

(Continued)

FOREIGN PATENT DOCUMENTS

| | | |
|---|---|---|
| CN | 101855519 A | 10/2010 |
| CN | 102442250 A | 5/2012 |

(Continued)

OTHER PUBLICATIONS

Nick Jaynes, (Smart) Watch Your Mercedes From Afar with Pebble Technology on Your Wrist, Dec. 23 2013, In 3 pages.

(Continued)

*Primary Examiner* — John R Olszewski
*Assistant Examiner* — Navid Ziaeianmehdizadeh
(74) *Attorney, Agent, or Firm* — Christopher G. Darrow; Darrow Mustafa PC

(57) ABSTRACT

A method for operating a vehicle includes receiving, at a wearable article, a first input from a user indicating a vehicle function to be performed on a vehicle, receiving a second input indicating a gesture by the user for authentication, and generating, at the wearable article, a control signal for performing the vehicle function on the vehicle based on a successful authentication of the user.

18 Claims, 24 Drawing Sheets

(56) References Cited

U.S. PATENT DOCUMENTS

| | | | |
|---|---|---|---|
| 4,994,204 A | 2/1991 | Doane et al. | |
| 5,240,636 A | 8/1993 | Doane et al. | |
| 5,454,074 A | 9/1995 | Hartel et al. | |
| 5,574,641 A * | 11/1996 | Kawakami | G08B 21/06 180/272 |
| 5,589,958 A | 12/1996 | Lieb | |
| 5,652,564 A | 7/1997 | Winbush | |
| 5,705,977 A | 1/1998 | Jones | |
| 5,774,591 A | 6/1998 | Black et al. | |
| 5,784,036 A | 7/1998 | Higuchi et al. | |
| 5,867,802 A | 2/1999 | Borza | |
| 5,920,363 A | 7/1999 | Rofe | |
| 6,227,862 B1 | 5/2001 | Harkness | |
| 6,285,952 B1 | 9/2001 | Kim | |
| 6,362,734 B1 | 3/2002 | McQuade et al. | |
| 6,393,348 B1 | 5/2002 | Ziegler et al. | |
| 6,522,027 B1 * | 2/2003 | Morillon | B60R 25/245 307/10.1 |
| 6,654,070 B1 | 11/2003 | Rofe | |
| 6,696,943 B1 | 2/2004 | Elrod et al. | |
| 6,735,517 B2 | 5/2004 | Engelsberg et al. | |
| 6,791,462 B2 * | 9/2004 | Choi | G08B 21/06 340/575 |
| 7,050,606 B2 | 5/2006 | Paul et al. | |
| 7,053,866 B1 | 5/2006 | Mimran | |
| 7,095,313 B2 | 8/2006 | Gobe et al. | |
| 7,126,583 B1 | 10/2006 | Breed | |
| 7,126,853 B2 | 10/2006 | Kim | |
| 7,224,325 B2 | 5/2007 | Nagano et al. | |
| 7,248,151 B2 | 7/2007 | Mc Call | |
| 7,398,140 B2 * | 7/2008 | Kernwein | B61L 23/00 246/115 |
| 7,561,966 B2 | 7/2009 | Nakamura et al. | |
| 7,561,996 B2 | 7/2009 | Lu et al. | |
| 7,764,247 B2 | 7/2010 | Blanco et al. | |
| 7,847,678 B2 | 12/2010 | Kawamata et al. | |
| 7,897,888 B2 | 3/2011 | Dimig | |
| 7,982,620 B2 | 7/2011 | Prokhorov et al. | |
| 8,096,069 B2 | 1/2012 | Ishikawa et al. | |
| 8,120,651 B2 | 2/2012 | Ennis | |
| 8,317,329 B2 | 11/2012 | Seder et al. | |
| 8,344,870 B2 | 1/2013 | Evans et al. | |
| 8,395,529 B2 | 3/2013 | Seder et al. | |
| 8,463,488 B1 | 6/2013 | Hart | |
| 8,523,667 B2 | 9/2013 | Clavin et al. | |
| 8,527,146 B1 | 9/2013 | Jackson et al. | |
| 8,552,847 B1 * | 10/2013 | Hill | G06F 3/016 116/205 |
| 8,560,013 B2 | 10/2013 | Jotanovic | |
| 8,577,543 B2 | 11/2013 | Basir et al. | |
| 8,633,979 B2 | 1/2014 | Szczerba et al. | |
| 8,818,647 B2 | 8/2014 | Breed | |
| 8,924,076 B2 | 12/2014 | Boote et al. | |
| 8,942,428 B2 | 1/2015 | Snook et al. | |
| 9,037,354 B2 | 5/2015 | Mondragon et al. | |
| 9,083,581 B1 | 7/2015 | Addepalli et al. | |
| 9,293,042 B1 | 3/2016 | Wasserman | |
| 2002/0022979 A1 | 2/2002 | Whipp et al. | |
| 2002/0029103 A1 | 3/2002 | Breed et al. | |
| 2002/0067289 A1 | 6/2002 | Smith | |
| 2002/0126876 A1 | 9/2002 | Paul et al. | |
| 2003/0034958 A1 | 2/2003 | Waesterlid et al. | |
| 2003/0076968 A1 * | 4/2003 | Rast | G11B 19/027 381/124 |
| 2003/0190076 A1 | 10/2003 | DeLean | |
| 2003/0204526 A1 | 10/2003 | Salehi-Had | |
| 2004/0052418 A1 | 3/2004 | DeLean | |
| 2004/0137877 A1 * | 7/2004 | Crowhurst | G07C 9/00182 455/411 |
| 2004/0208496 A1 * | 10/2004 | Pilu | H04N 5/232 396/263 |
| 2005/0125669 A1 * | 6/2005 | Stewart | H04L 63/0492 713/171 |
| 2005/0271279 A1 | 12/2005 | Fujimura et al. | |
| 2006/0078691 A1 | 4/2006 | Cherif et al. | |
| 2006/0145825 A1 * | 7/2006 | Mc Call | B60R 25/2045 340/426.35 |
| 2007/0027621 A1 | 2/2007 | Operowsky et al. | |
| 2007/0298885 A1 | 12/2007 | Tran | |
| 2008/0048930 A1 | 2/2008 | Brred | |
| 2008/0051946 A1 | 2/2008 | Brred | |
| 2008/0167892 A1 | 7/2008 | Clark et al. | |
| 2008/0174451 A1 * | 7/2008 | Harrington | G08B 21/06 340/905 |
| 2008/0195428 A1 | 8/2008 | O'Sullivan | |
| 2008/0212196 A1 | 9/2008 | Watanabe et al. | |
| 2008/0238667 A1 * | 10/2008 | Olson | G06K 19/0723 340/541 |
| 2008/0255731 A1 | 10/2008 | Mita et al. | |
| 2009/0067449 A1 | 3/2009 | Tian | |
| 2009/0146947 A1 | 6/2009 | Ng | |
| 2009/0264082 A1 * | 10/2009 | Tieman | G01S 1/66 455/73 |
| 2009/0278915 A1 | 11/2009 | Kramer et al. | |
| 2009/0290021 A1 | 11/2009 | Rudesill et al. | |
| 2010/0039221 A1 * | 2/2010 | Lickfelt | B60R 25/245 340/5.72 |
| 2010/0075656 A1 | 3/2010 | Howarter et al. | |
| 2010/0083373 A1 | 4/2010 | White et al. | |
| 2010/0127847 A1 | 5/2010 | Evans et al. | |
| 2010/0225050 A1 | 9/2010 | Desjardins | |
| 2011/0001932 A1 | 1/2011 | Zuehlsdorff | |
| 2011/0010056 A1 | 1/2011 | Inayoshi et al. | |
| 2011/0045842 A1 | 2/2011 | Rork et al. | |
| 2011/0171941 A1 | 7/2011 | Cusick et al. | |
| 2011/0193939 A1 | 8/2011 | Vassigh et al. | |
| 2011/0271198 A1 | 11/2011 | Brakensiek et al. | |
| 2012/0044352 A1 | 2/2012 | Aimura et al. | |
| 2012/0089273 A1 * | 4/2012 | Seder | B60Q 1/268 701/2 |
| 2012/0105226 A1 | 5/2012 | Bourdeau et al. | |
| 2012/0209468 A1 | 8/2012 | Thomas | |
| 2012/0232749 A1 | 9/2012 | Schoenberg et al. | |
| 2012/0262403 A1 | 10/2012 | Tissot | |
| 2012/0265814 A1 | 10/2012 | Roussis | |
| 2012/0296559 A1 | 11/2012 | Gueziec et al. | |
| 2013/0030645 A1 | 1/2013 | Divine et al. | |
| 2013/0054701 A1 | 2/2013 | Leeder et al. | |
| 2013/0063336 A1 | 3/2013 | Sugimoto et al. | |
| 2013/0066526 A1 | 3/2013 | Mondragon et al. | |
| 2013/0166391 A1 | 6/2013 | Blow et al. | |
| 2013/0231800 A1 | 9/2013 | Ricci | |
| 2013/0238165 A1 | 9/2013 | Garrett et al. | |
| 2013/0244634 A1 | 9/2013 | Garrett et al. | |
| 2013/0258693 A1 | 10/2013 | Hatakeyama et al. | |
| 2013/0261871 A1 | 10/2013 | Hobbs et al. | |
| 2013/0300644 A1 | 11/2013 | Chen et al. | |
| 2014/0007618 A1 | 1/2014 | Brown, III | |
| 2014/0068713 A1 | 3/2014 | Nicholson et al. | |
| 2014/0082676 A1 | 3/2014 | Barowski et al. | |
| 2014/0129605 A1 | 5/2014 | Huang et al. | |
| 2014/0239982 A1 * | 8/2014 | Alameh | H03K 17/955 324/684 |
| 2014/0282931 A1 * | 9/2014 | Protopapas | G06F 21/31 726/5 |
| 2014/0300461 A1 | 10/2014 | Stark | |
| 2014/0372867 A1 | 12/2014 | Tidhar et al. | |
| 2014/0379175 A1 | 12/2014 | Mittermeier | |
| 2015/0077235 A1 | 3/2015 | Pisz et al. | |
| 2015/0077272 A1 | 3/2015 | Pisz et al. | |
| 2015/0077327 A1 | 3/2015 | Pisz et al. | |
| 2015/0077561 A1 | 3/2015 | Schulz | |
| 2015/0081133 A1 | 3/2015 | Schulz | |
| 2015/0081167 A1 | 3/2015 | Pisz et al. | |
| 2015/0180999 A1 | 6/2015 | Pisz et al. | |
| 2015/0220991 A1 | 8/2015 | Butts et al. | |

FOREIGN PATENT DOCUMENTS

| | | |
|---|---|---|
| CN | 102745141 A | 10/2012 |
| CN | 102914317 A | 2/2013 |
| CN | 103158618 A | 6/2013 |

(56) References Cited

FOREIGN PATENT DOCUMENTS

| | | |
|---|---|---|
| CN | 103273885 A | 9/2013 |
| DE | 102007005028 A1 | 8/2008 |
| DE | 102012203535 A1 | 9/2013 |
| EP | 1970265 A2 | 9/2008 |
| EP | 2441635 A1 | 4/2012 |
| EP | 2689966 A1 | 1/2014 |
| KR | 1020070049338 | 5/2007 |
| WO | 2013034556 A1 | 3/2013 |
| WO | 2013101046 A1 | 7/2013 |

OTHER PUBLICATIONS

Apple Inc., "Apple CarPlay The best iPhone experience on four wheels.", 2014, 29 Pages.

Fleischfresser, "GM Explores Interactive Backseat Windows", printed from http://www.smartplanet.com/blog/transportation/gm-explore-interactive-backseat-windows/1335 on Sep. 10, 2013, 2 pages.

U.S. Appl. No. 14/175,862, filed Feb. 7, 2014, James T. Pisz, et al.

International Search Report and Written Opinion for PCT/US2015/046626, dated Dec. 7, 2015, 17 pgs.

* cited by examiner

FIG. 20A
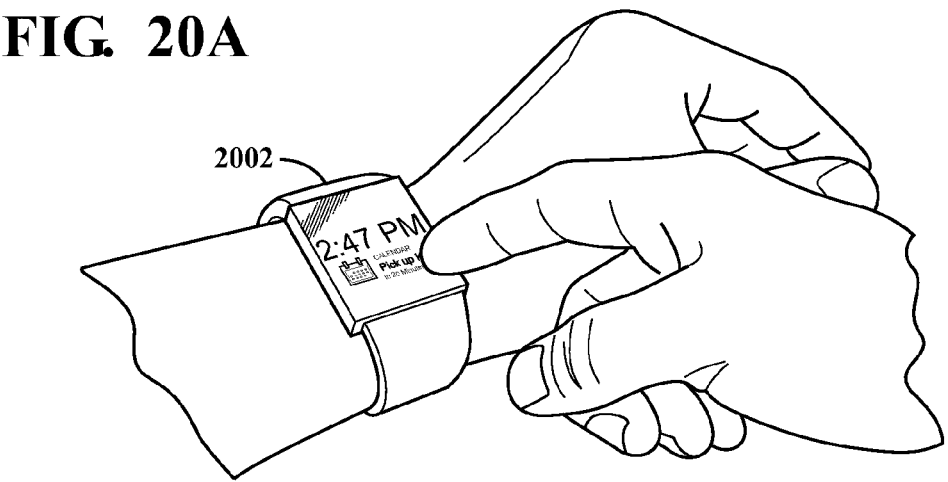
FIG. 20B
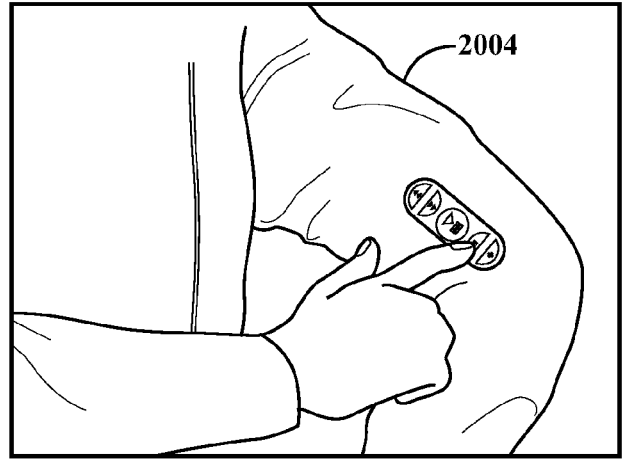
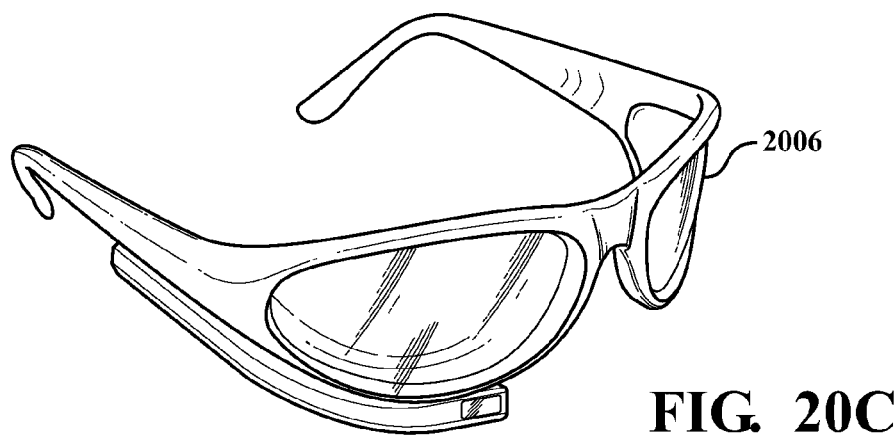
FIG. 20C

INTEGRATED WEARABLE ARTICLE FOR INTERACTIVE VEHICLE CONTROL SYSTEM

CROSS-REFERENCE TO RELATED APPLICATIONS

The present disclosure is a continuation-in-part of U.S. patent application Ser. No. 14/180,563, filed Feb. 14, 2014, which claims priority to U.S. Provisional Patent Application Ser. No. 61/878,898, filed Sep. 17, 2013. The present disclosure is a continuation-in-part of U.S. patent application Ser. No. 14/175,862, filed Feb. 7, 2014, which claims priority to U.S. Provisional Patent Application Ser. No. 61/878,898, filed Sep. 17, 2013.

BACKGROUND

The present disclosure relates to a vehicle and more particularly to systems and methods therefor. A key fob allows a driver to perform remote control functions such as locking or starting a vehicle. However, the driver needs to carry the key fob around, such as in a key chain, a pocket, or a purse. Recent development of wearable technology has made it possible for people to interact with the vehicle through a wearable article, such as a smart watch or wristband.

SUMMARY

This disclosure relates to integrated wearable article for an interactive vehicle control system. In one aspect, a system can include a user input subsystem and a user recognition and authentication subsystem in communication with the user input subsystem. The user input subsystem includes a wearable article and is configured to receive inputs from a user. The user recognition and authentication subsystem is configured to detect and authenticate the user based on the inputs received from the wearable article, or the vehicle, or both. The inputs received from the wearable article can include, for example, a user input indicating a vehicle function to be performed, a gesture input by the user for authentication, or both. The inputs received from the vehicle can include, for example, a gesture input by the user for authentication. The wearable article can include a wearable computing device configured to perform at least one vehicle function on a vehicle. The wearable article can be, for example, a smart watch, a smart clothing article, a transdermal chip or a wearable sensor. A driver score can be generated for driver actions associated with vehicle functions performed by the user on the vehicle. The driver score can be transmitted to the wearable article, and can be uploaded, for example, to a home computer or an external database via cloud.

In another aspect, a method for operating a vehicle can include receiving, at a wearable article, a first input from a user indicating a vehicle function to be performed on a vehicle, receiving a second input indicating a gesture by the user for authentication, and generating, at the wearable article, a control signal for performing the vehicle function on the vehicle based on a successful authentication of the user. The wearable article can be, for example, a smart watch, a smart clothing article, a transdermal chip or a wearable sensor. A driver score can be generated for driver actions associated with vehicle functions performed by the user on the vehicle. The driver score can be transmitted to the wearable article, and can be uploaded, for example, to a home computer or an external database via cloud.

In another aspect, a wearable article can include one or more processors and a memory. The memory stores data and program instructions that can be executed by the processors. The wearable article can be a wearable computing device, such as a smart watch or a wearable sensor. The processors are configured to execute instructions stored in the memory. The instructions include receiving a first input from a user indicating a vehicle function to be performed on a vehicle, receiving a second input indicating a gesture by the user for authentication, and generating a control signal to perform the vehicle function based on a successful authentication of the user. The wearable article can be, for example, a smart watch, a smart clothing article, a transdermal chip or a wearable sensor. A driver score can be generated for driver actions associated with vehicle functions performed by the user on the vehicle. The driver score can be transmitted to the wearable article, and can be uploaded, for example, to a home computer or an external database via cloud.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 20A is an example wearable article;

FIG. 20B is another example wearable article;

FIG. 20C is another example wearable article;

DETAILED DESCRIPTION

Wearable technology has developed over the years to allow people to interact with smart home appliances or a vehicle. A wearable article can be integrated with a key fob for operating an automobile so that the user will no longer need to carry the key fob separately. For example, with the digital key fob functionalities incorporated into a smart watch, a user can put on the smart watch every morning without struggling to find the key. The user will no longer need to carry the key fob separately. In addition to being used as a watch or wristband, the smart watch can be worn by the user to perform vehicle functions on the vehicle.

In some instances, the wearable article can be implemented to receive user indications of the vehicle functions to be performed on the vehicle and gesture inputs for user authentication in order for such vehicle functions to be performed. A control signal to perform the vehicle functions can be generated based on a successful authentication. In some implementations (e.g., the multi-factor authentication), the gesture input can be used in the multi-factor authentication in conjunction with the user input received from the wearable article to authenticate the user. The second gesture input can be detected by a sensor, which can be coupled to the vehicle or the wearable article. The sensor can be used to detect whether the user is wearing the wearable article. When the user is not wearing the wearable article, access to some or all vehicle functions can be denied.

The wearable article can be used to sense information from a user, such as biometrics and driving information. In some implementations, a driver score can be generated for driver actions performed on the vehicle. The driver score can be used to help the driver improving driving skills and alert the driver when deteriorating performance occurs. For example, the driver score can be an option selectable from the menu screen of the wearable article and calculated based on sensed information of driver actions. When the driver keys off the vehicle, the driver score can be sent to the wearable article for display, storage or further processing. The driver score received at the wearable article can be uploaded to, for example, a personal computer, a smartphone, or an external database via the cloud. Data analysis can be used to improve safe driving skills or for other application-specific purposes. For example, the driver scores can be placed into a social ranking system and the user can review and evaluate his driving performances relative to others in the social ranking system.

Figure 1:
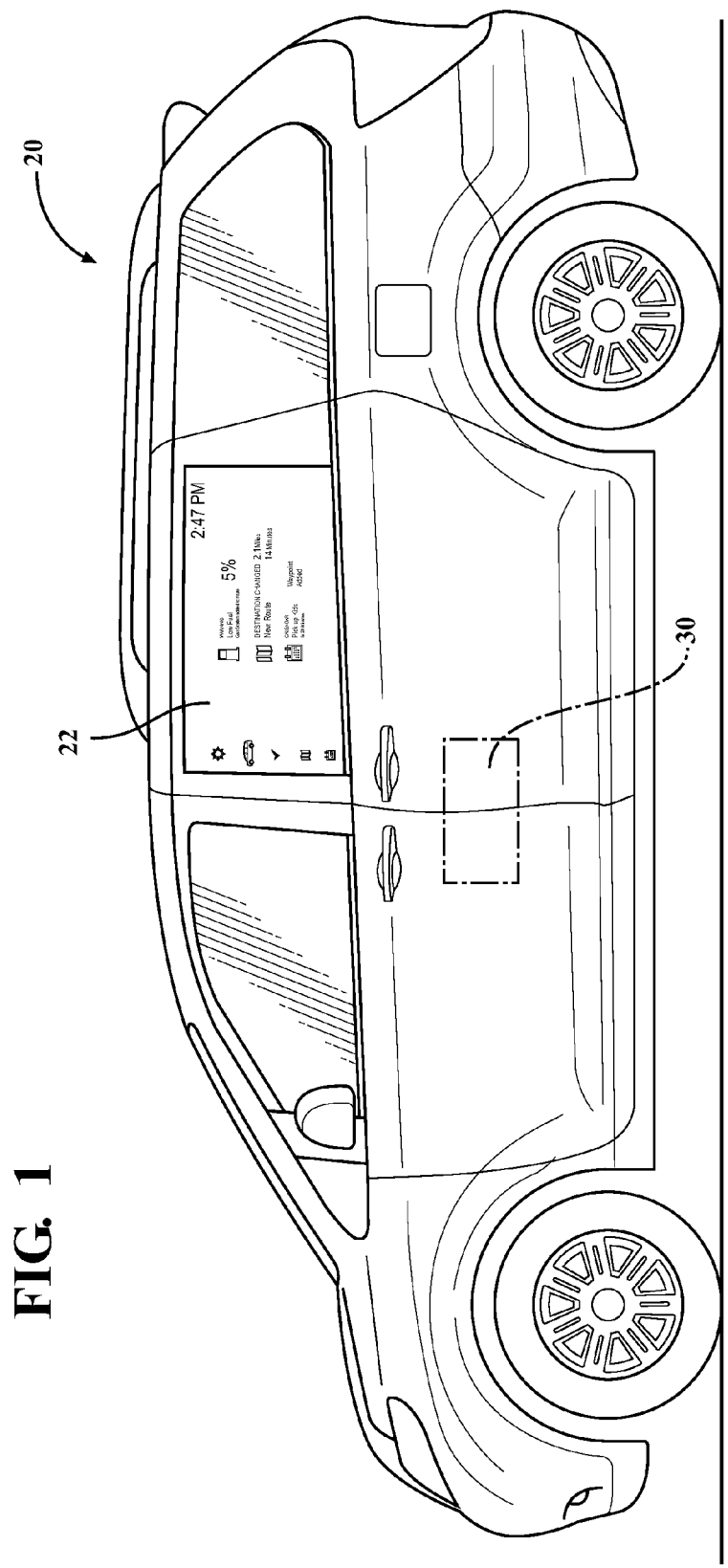
FIG. 1 is a pictorial representation of an example vehicle for use with an interactive vehicle window display system.

FIG. 1 schematically illustrates a vehicle 20 with a window 22 and an interactive vehicle window display system 30. Although the window 22 is here shown as a driver's side passenger window of a minivan type vehicle in the disclosed, non-limiting embodiment, it should be appreciated that various vehicle types and windows will also benefit herefrom.

Figure 2:
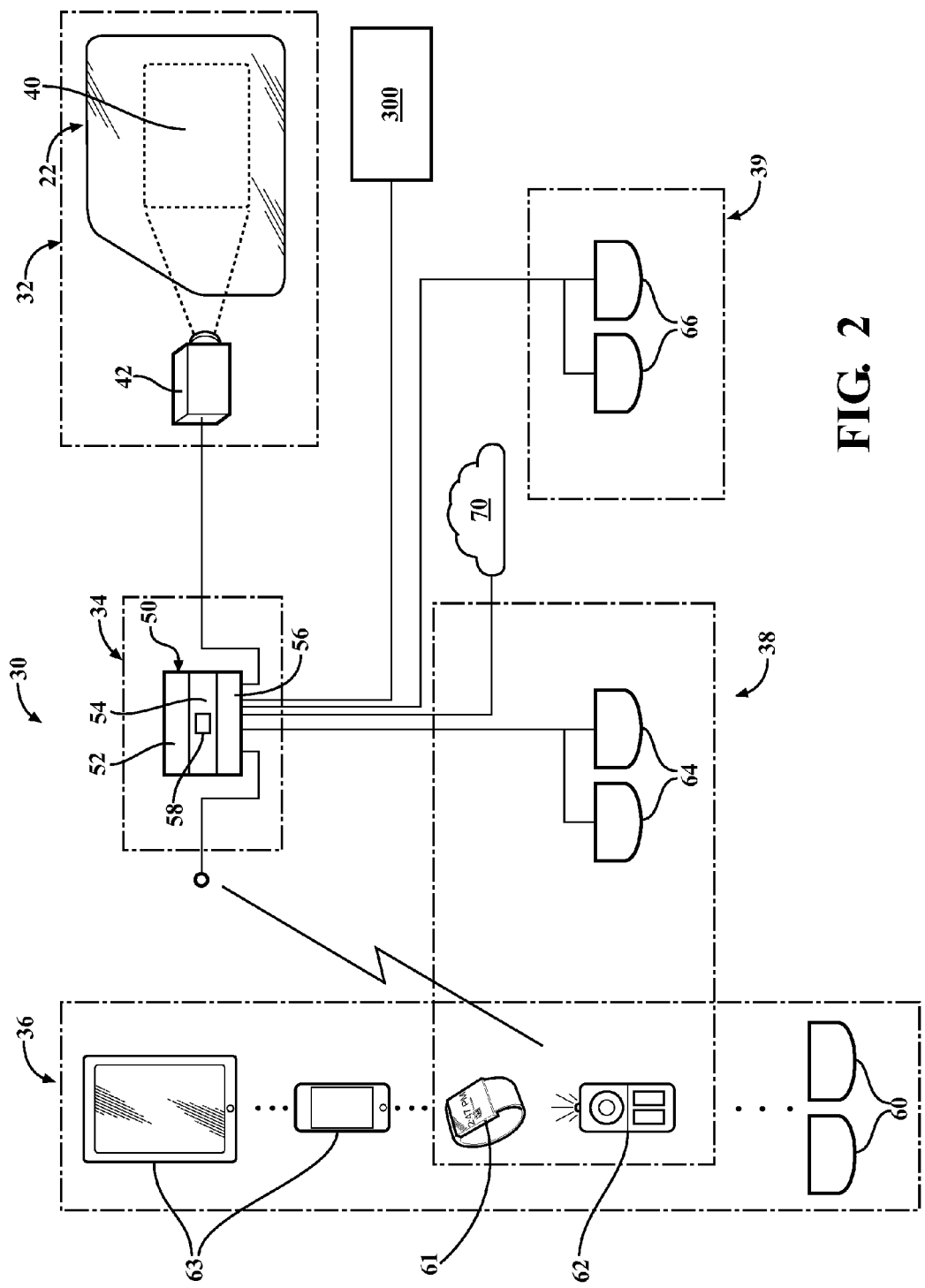
FIG. 2 is a schematic block diagram of the interactive vehicle window display system according to one non-limiting embodiment.

With reference to FIG. 2, selected portions of the system 30 are schematically illustrated. The system 30 generally includes an interactive display subsystem 32, a control subsystem 34, a user input subsystem 36, a user identification subsystem 38, and a user location subsystem 39. In some embodiments, the user identification subsystem 38 can be implemented as a user recognition and authentication subsystem. It should be appreciated that although particular subsystems are separately defined, each or any of the subsystems may be combined or segregated via hardware and/or software of the system 30. Additionally, each or any of the subsystems can be implemented using one or more computing devices including conventional central processing units or other devices capable of manipulating or processing information.

The interactive display subsystem 32 can include any device or devices capable of displaying images on a vehicle window 22 under the control of system 30, and can be adapted for viewing from outside the vehicle, inside the vehicle, or both. In one non-limiting example the interactive display subsystem 32 can include a display device integral to the window 22, such as an LCD. Such a display can be illuminated by ambient light or by one or more light sources under the control of system 30. Such light sources can be mounted at any operable locations enabling light emission onto a window from inside or outside the vehicle, depending on whether the display is to be viewed by a user located outside or inside the vehicle. Examples of such mounting locations can include in the floor, in the vehicle headliner, within the vehicle door structure, or in the exterior door panel.

Figure 3:
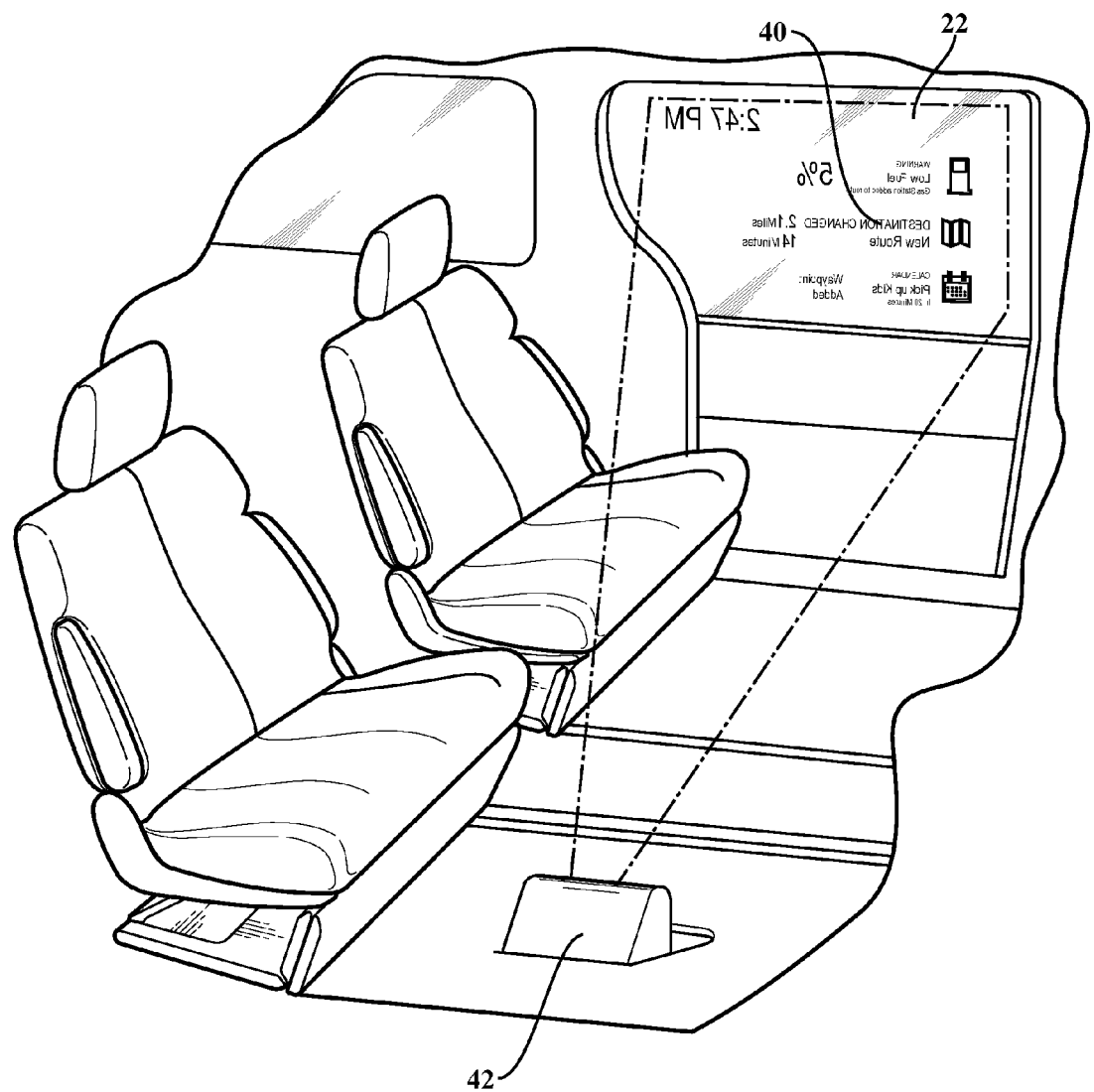
FIG. 3 is a partial interior view of the vehicle with the interactive vehicle window display system.

In another non-limiting example, the interactive display subsystem 32 can include a coating 40 and a projector 42. The coating 40, for example, may be a polymer dispersed liquid crystal (PDLC) film, applied to the window 22 to provide both transparency when inactive and partial or complete opacity when active. The window 22 treated with the coating 40 is thereby operable to display content as a projection page visible from outside and/or inside the vehicle 20 (FIG. 1). The projector 42 can be mounted in the floor (FIG. 3) or other locations within the vehicle 20, such as the vehicle headliner or within the vehicle door structure as well as in locations on the vehicle exterior such as in an exterior door panel. The illustrated shaded area extending from the projector 42 toward the window 22 schematically represents the projection of output in the form of content pages provided by the projector 42. In response to the approach of a recognized user, the coating 40 changes from transparent to opaque so that the projector 42 may project the output onto the window 22.

As will be further described, the displayed content can include personalized information or entertainment content such as videos, games, maps, navigation, vehicle diagnostics, calendar information, weather information, vehicle climate controls, vehicle entertainment controls, email, internet browsing, or any other interactive applications associated with the recognized user, whether the information originates onboard and/or off board the vehicle 20.

The control subsystem 34 generally includes a control module 50 with a processor 52, a memory 54, and an interface 56. The processor 52 may be any type of microprocessor having desired performance characteristics. The memory 54 may include any type of computer readable medium which stores the data and control algorithms described herein such as a user support system algorithm 58. The functions of the algorithm 58 are disclosed in terms of functional block diagrams (FIG. 6) and representative pages (FIGS. 9-14), and it should be understood by those skilled in the art with the benefit of this disclosure that these functions may be enacted in either dedicated hardware circuitry or programmed software routines capable of execution in a microprocessor based electronics control embodiment.

With continued reference to FIG. 2, the control module 50 may be a portion of a central vehicle control, a stand-alone unit, or other system such as a cloud-based system. Other operational software for the processor 52 may also be stored in the memory 54. The interface 56 facilitates communication with other subsystems such as the interactive display subsystem 32, the user input subsystem 36, the user identification subsystem 38, and the user location subsystem 39. It should be understood that the interface 56 may also communicate with other onboard vehicle systems and off-board vehicle systems. Onboard systems include but are not limited to, a vehicle head unit 300 which communicates with vehicle sensors that provide, for example, vehicle tire pressure, fuel level and other vehicle diagnostic information. Offboard vehicle systems can provide information which includes but is not limited to, weather reports, traffic, and other information which may be provided via cloud 70.

The user input subsystem 36 can include one or more input sensors including onboard input sensors 60, offboard input devices, or both. Onboard input sensors 60 can include one or more motion cameras or other light sensors configured to detect gesture commands, one or more touch sensors configured to detect touch commands, one or more microphones configured to detect voice commands, or other onboard devices configured to detect user input. The user input subsystem can also include offboard input devices such as a wearable article 61, a key fob 62 and/or a personal electronic device 63 of the user, e.g. a tablet, smart phone, or other mobile device. The wearable article 61 can be a wearable computing device, such as a smart watch or a wearable sensor.

In some instances, the wearable article 61 can be integrated with the key fob 62 so that the user will no longer need to carry the key fob 62 separately. As will be described in further detail below, the wearable article 61 can be configured to receive user inputs to indicate the vehicle functions to be performed on the vehicle 20. The wearable article 61 can also be configured to receive gesture inputs from the user for authentication before such vehicle functions can be performed.

Figure 5:
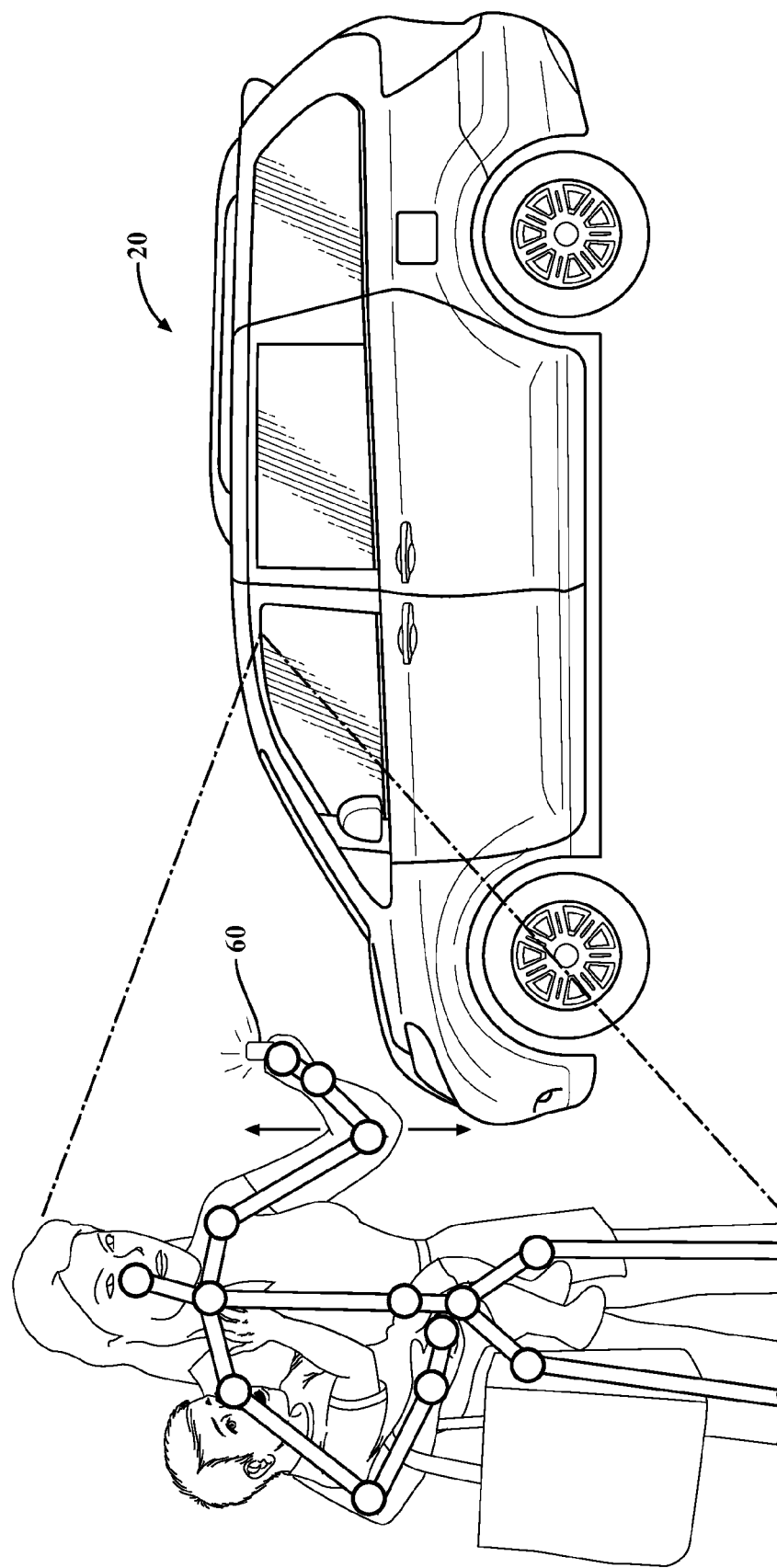
FIG. 5 is a pictorial representation of the vehicle illustrating user identification via a wearable article, skeletal joint relationship, key fob and/or user gesture.

In some embodiments, the system 30 utilizes a multi-factor authentication for security and authorization. The authentication can be implemented, for example, in the user identification subsystem 38. Example multi-factor authentication may include receiving inputs from the wearable article 61, the key fob 62, skeleton joint relationship recognition (FIG. 5), and/or a gesture password (FIG. 8). The user may be provisionally identified with one of these factors, but may require a total of at least two factors to authenticate the user prior to display of certain content. That is, the user will not be granted access to all the features in user mode 104 until a multi-factor authentication is passed and the user is within a predetermine range of the vehicle 20. This authentication process ensures the security of the vehicle and the personal information embedded in the system 30. In one disclosed non-limiting embodiment, the first authentication factor can be the wearable article 61, which integrates the functionalities of a digital key fob, and the second can be the skeleton joint relationship (FIG. 7) of the user. If the user does not have their wearable article 61 or the key fob 62, the skeleton joint relationship may become the first authentication factor and a gesture password such as a wave or particular arm movement (FIG. 8) becomes the second. In another example, the first authentication factor can be the wearable article with the integrated key fob functionalities, and the second can be a gesture input from the user, such as the gesture password or the skeleton joint relationship. Other combinations of authentication factors are also possible and the second factor can be optional. For example, the second factor can be required when there is a heightened need for security, e.g., when the vehicle is parked in a public location or in a high crime area. In another example, the user can be authenticated only when it is detected that he is wearing the wearable article 61 or carrying the key fob 62.

The wearable article 61 in one disclosed non-limiting embodiment may be encrypted to uniquely identify each user to the system 30. Additional security protocols such as a rolling time key to ensure that even the encrypted key cannot be intercepted and re-used by unauthorized devices may additionally be utilized.

Once the wearable article 61 is recognized, the user will be welcomed and pre-authenticated to allow limited access to selected content in the user mode 104. This will provide the user with enough time to cycle through multiple content features during the walkup experience, yet maintain security with respect to other content features e.g., a destination. Once the user has been fully authenticated, all content features, e.g. destination made during the pre-authenticated state, are validated for display. If the authentication fails, the user will not be granted access to the vehicle 20 or any sensitive information. The system 30 in this disclosed non-limiting embodiment allows pre-authenticated access at about 30-40 feet and full access at about 15-25 feet from the vehicle.

Figure 7:
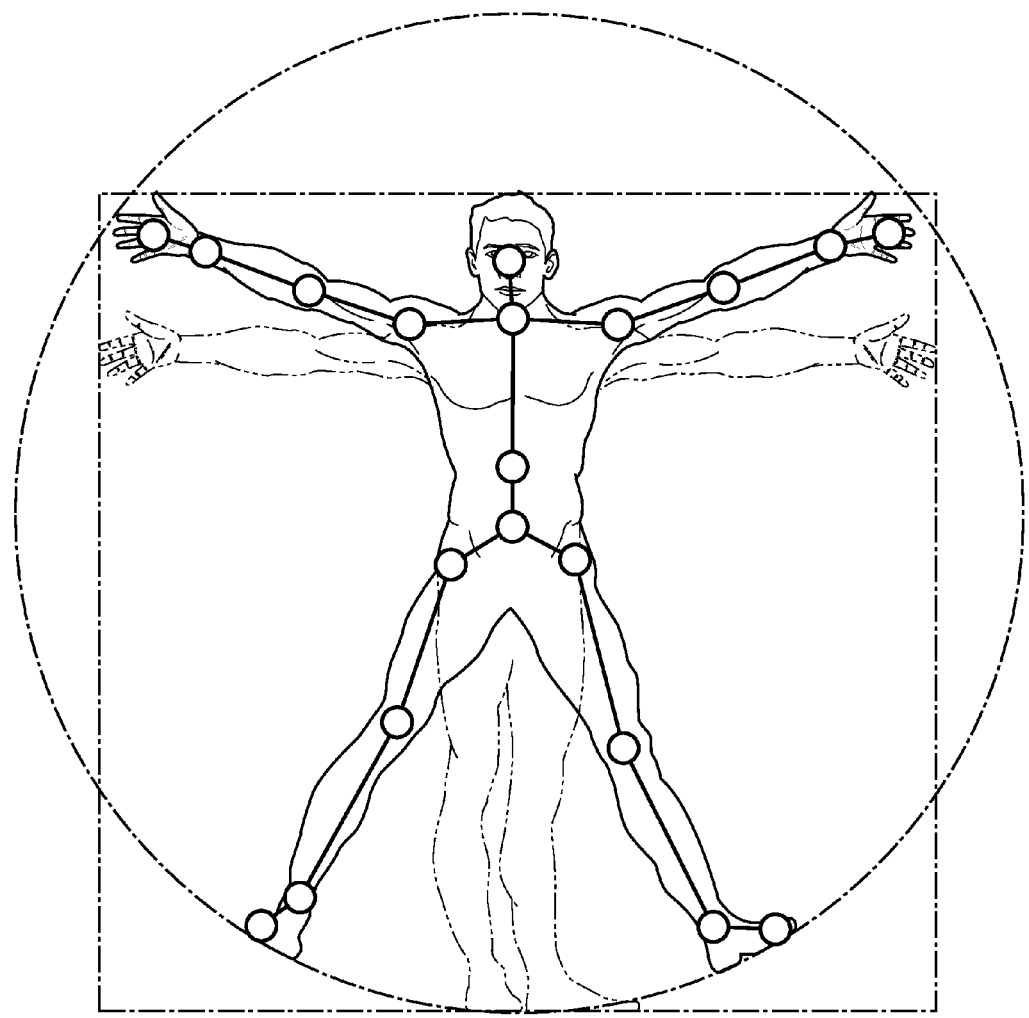
FIG. 7 is a pictorial representation of an example skeletal joint relationship recognizable by the system.
Figure 8:
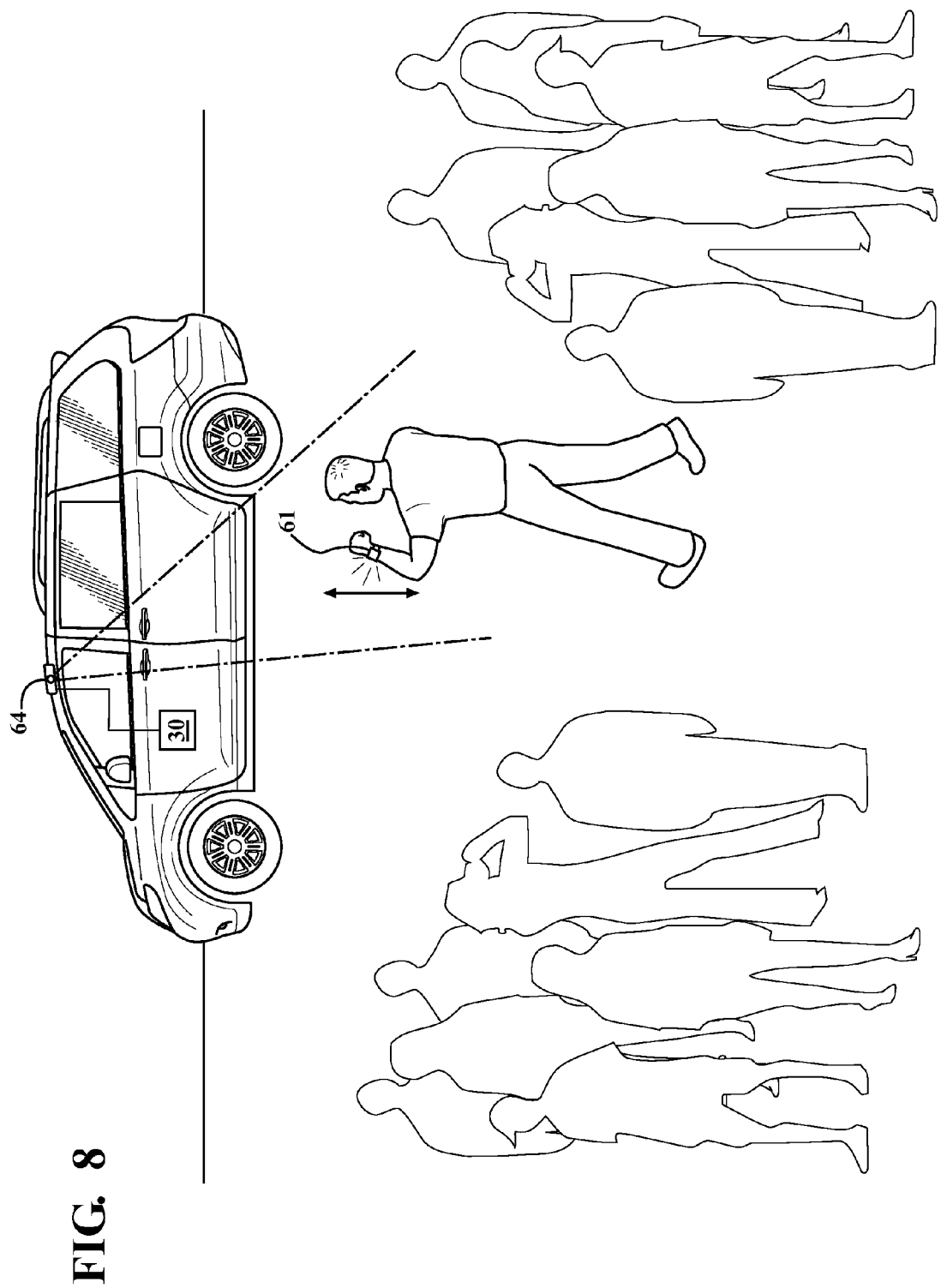
FIG. 8 is an illustration of an example wearable article and an example user gesture recognizable by the system according to one non-limiting embodiment.

With respect to FIG. 7, to provide further authentication, the system 30 is operable to recognize a user by his skeleton joint relationships. Skeleton joint relationships in this disclosed non-limiting embodiment facilitate pre-authentication but not full authentication that grants full access to the vehicle 20. However, if the user has been pre-authenticated via the wearable article 61 or the key fob 62, a matching skeleton joint relationship will fully authenticate the user. That is, the user identification subsystem 38 may utilize skeleton joint relationships as the second point of identification.

Figure 19:
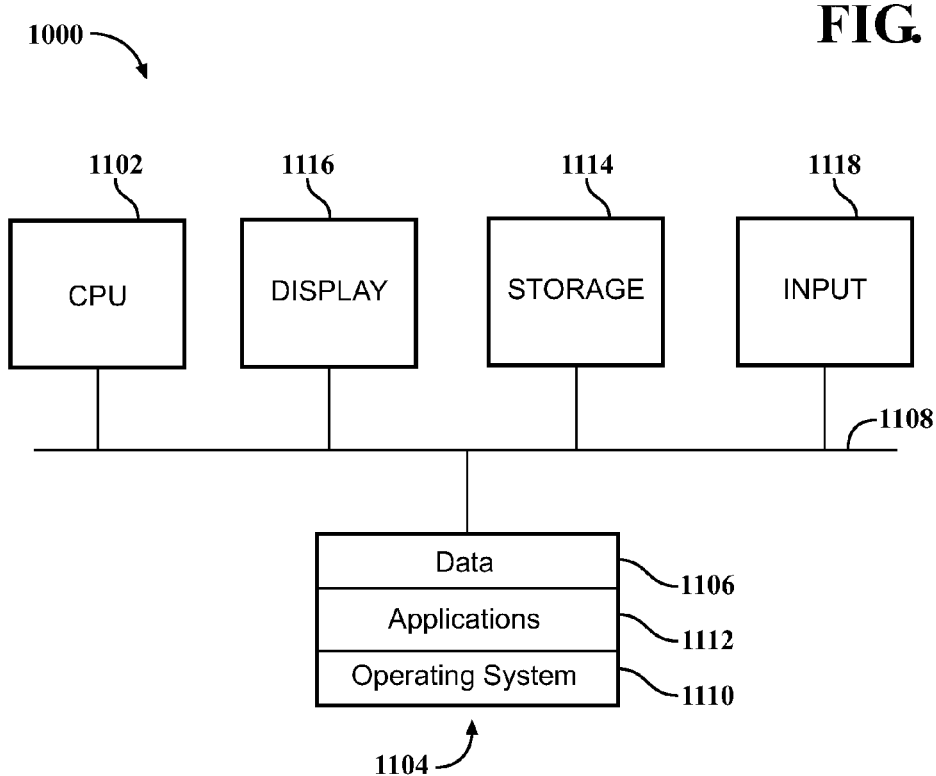
FIG. 19 is a schematic block diagram of a wearable article according to one non-limiting embodiment.

FIG. 19 is a block diagram of a computing device 1000 for implementing a wearable article 61. The wearable article 61 can include some or all functionalities of a digital key fob such as key fob 62. For example, with the digital key fob being incorporated into a smart watch, a user can put on the smart watch every morning without having to struggle to find the key. The computing device 1000 can be any type of wearable, handheld, or other form of single computing device, or can include multiple computing devices. For example, the computing device 1000 can be a smart watch 2002 (FIG. 20A), a personal mobile device, a smart clothing article 2004 (FIG. 20B), a transdermal chip (not shown), a wearable sensor (not shown), or a smartglasses article 2006 (FIG. 20C).

The processing unit in the computing device 1000 can be a conventional central processing unit (CPU) 1102 or any other type of device, or multiple devices, capable of manipulating or processing information. The memory 1104 in the computing device 1000 can be a random access memory device (RAM) or any other suitable type of storage device. The memory 1104 can include data 1106 that is accessed by the CPU using a bus 1108. The memory 1104 can also include an operating system 1110 and installed applications 1112, the installed applications 1112 including programs that permit the CPU 1102 to implement the instructions to generate control signals for performing vehicle functions on a vehicle as described. The instructions can also include performing functions that are not related to a vehicle, such as to track a user's biometrics or to display time. The computing device 1100 can also include secondary, additional or external storage 1114, for example, a memory card, flash drive, or any other form of computer readable medium. In one embodiment, the installed applications 1112 can be stored in a whole or in part in the external storage 1114 and loaded into the memory 1104 as needed for processing.

The computing device 1000 can include one or more output devices, such as a display 1116 and one or more input 1118 devices, such as a keypad, a touch sensitive device, a sensor, or a gesture sensitive input device that can receive user inputs. The computing device 1000 can be in communication with one or more of the subsystems via a communication device (not shown) such as a transponder/transceiver device or a Wi-Fi, infrared, or Bluetooth device. For example, the computing device 1000 can communicate with the control subsystem 34 through interface 56.

The computing device 1000 can be coupled to one or more vehicle devices configured to receive inputs from the user and provide feedback to the driver of the vehicle 20. As will be described, the computing device 1000 can also include a sensor (not shown) to take sensed information from the user such as voice commands, ultrasound, gesture or other inputs.

In some embodiments, the computing device 1000 can be a wearable computing device configured to perform vehicle functions on the vehicle 20. The vehicle functions can be implemented in the installed applications described above. As described in further detail below, the vehicle functions can include, among others, various remote control functions (FIGS. 23A-F), driver score function (FIG. 24B), panic mode (FIGS. 25A-C), a navigation function, an audio/video function, a climate control function, an internet access function, and a remote control function for controlling the vehicle. The remote control functions can include, for example, unlocking, locking (2308 in FIG. 23A), switching on flashlight (2310 in FIG. 23A), switching off flashlight, horn honk (2312 in FIG. 23A), starting (2302 in FIG. 23A), stopping (2306 in FIG. 23C), powering on, or powering off of the vehicle.

Figure 22A:
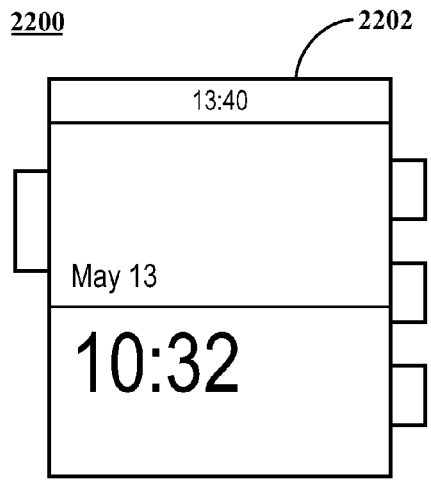
FIGS. 22A-C are example screen displays of an example wearable article according to one implementation.
Figure 22B:
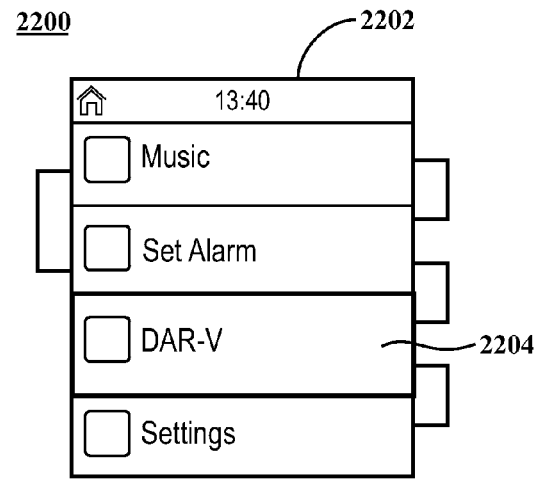

In the computing device 1000 described in FIG. 19, the applications 1112 stored in the memory 1104 can include vehicle applications such as application 2204 shown in FIG. 22B. The applications 1112 can also include autonomous driving applications such as a data analyzer, a path planner, a target value generator, an error detector, an adaptive module, or any other application configured to implement the autonomous driving system by performing such actions as identifying the driver, planning a route for autonomous operation of the vehicle, and improving positional accuracy of the vehicle.

FIGS. 20A-C show several non-limiting examples of the wearable article 61. Referring to FIG. 20A, the wearable article 61 can be implemented as a smart watch 2002. For example, with the digital key fob functionalities incorporated into the smart watch 2002, a user can put on the smart watch every morning without struggling to find the key. The user will no longer need to carry the key fob 62 separately. In addition to being used as a watch or wristband, the smart watch 2002 can be worn by the user to perform vehicle functions on the vehicle 20. Referring to FIG. 20B, the integrated wearable article 61 can be implemented as a smart clothing article 2004. The user can operate the smart clothing article 2004 by controlling certain vehicle functions incorporated into the smart clothing article 2004. Referring to FIG. 20C, the integrated wearable article 61 can also be implemented as smartglasses 2006. Other implementations of the wearable article 61 are also possible. For example, the wearable article 61 can be implemented as a smart phone device, a transdermal chip, a wearable sensor, or a remote access key fob.

Figure 21:
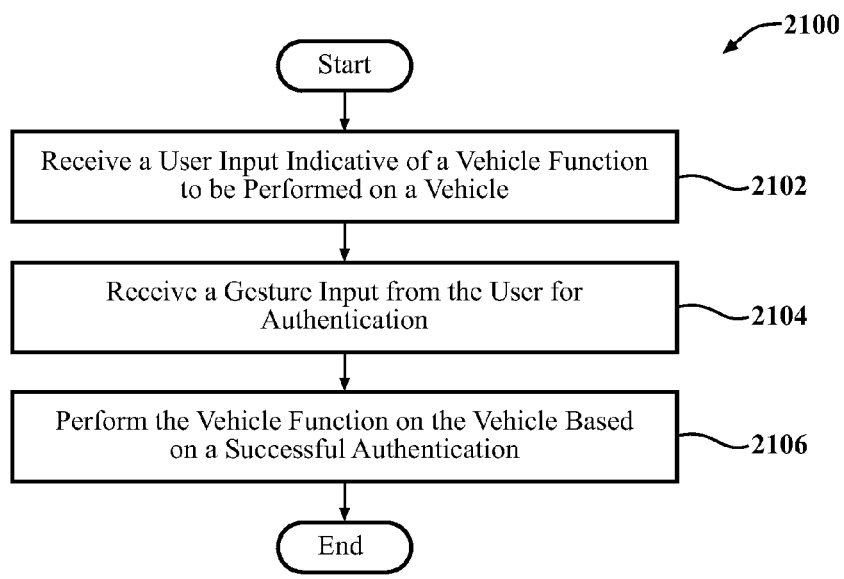
FIG. 21 is a flow diagram of process performed by a wearable article according to one non-limiting embodiment.

FIG. 21 is a flow diagram of an example process 2100 performed by the wearable computing device 1000 of FIG. 19, which will be described in details further below.

FIGS. 22A through 25C are example screen displays 2202 of a wearable article 2200 according to one implementation. FIG. 22A illustrates a screen that displays date and time. FIG. 22B illustrates a main menu from which a vehicle application icon 2204 can be selected. FIG. 22C illustrates a menu screen with three icons: remote control 2206, driver score 2208, and panic mode 2210.

Figures 23A, 23B, 23C:
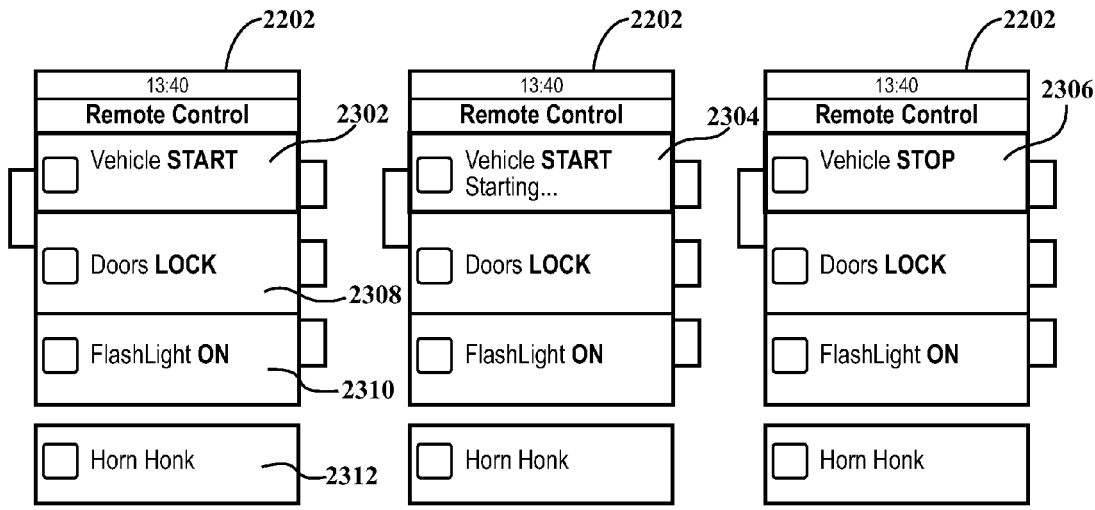
FIGS. 23A-F are example screens of the remote control mode of the example wearable article in FIGS. 22A-C.
Figures 23D, 23E, 23F:
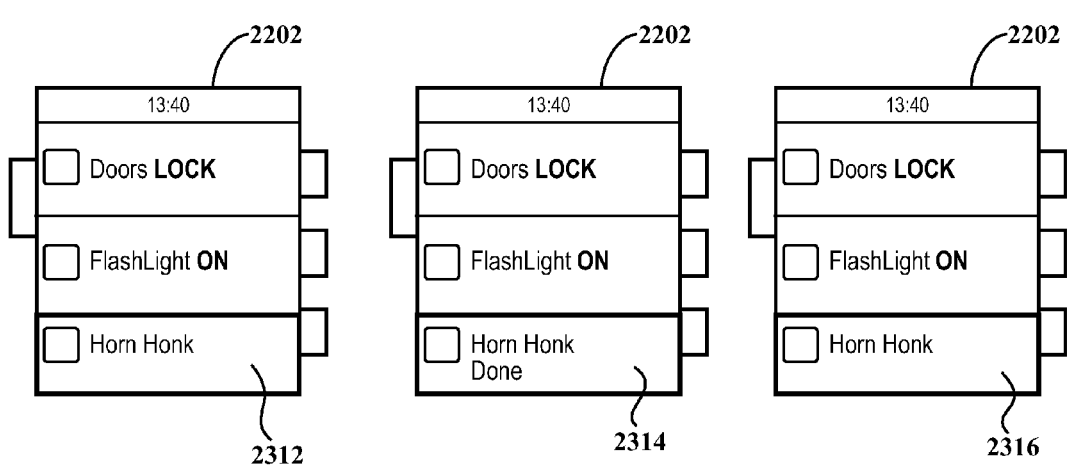

FIGS. 23A-F are example screen displays when remote control 2206 is selected. FIG. 23A illustrates a remote control screen showing a list of remote control functions to be selected by the user. The user can navigate the list up and down by scrolling or using up and down buttons. For example, when the user clicks on "Vehicle START" icon 2302, a control signal for starting the vehicle is sent to vehicle. A status message 2304 can be displayed on the control screen, as illustrated in FIG. 23B. Once the start function is performed, the icon can be switched or toggled to show "VEHICLE STOP" icon 2306 as illustrated in FIG. 23C. In another example illustrated in FIGS. 23D-F, "Horn Honk" icon 2312 can be selected and a status message 2314 can be generated for display on the screen. Once the horn honk is performed, the user can click on "Horn Honk" icon 2316 again to repeat the action.

Figure 24A:
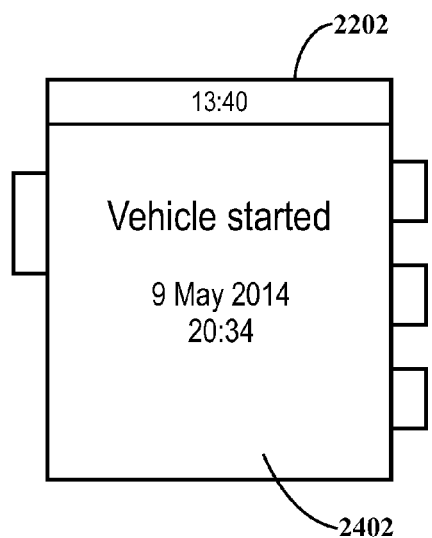
FIG. 24A is an example screen that displays a notification of a vehicle function performed on a vehicle.
Figure 24B:
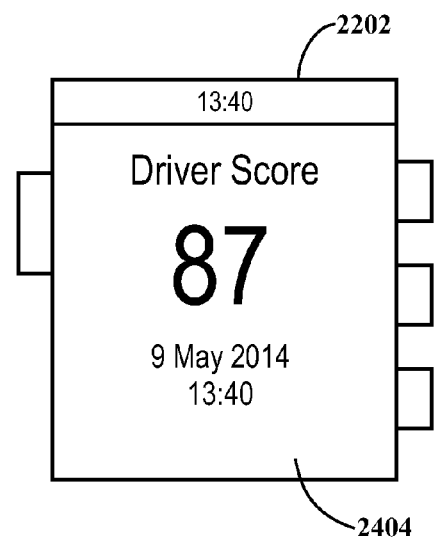
FIG. 24B is an example driver score alert screen for the example wearable article in FIGS. 22A-22C.

FIG. 24A illustrates a screen that displays an example notification 2402 ("Vehicle started"). The user can click on the notification 2402 to go back to the earlier screen. FIG. 24B illustrates a driver score alert screen 2404, which will be described in more details below.

Figure 25A:
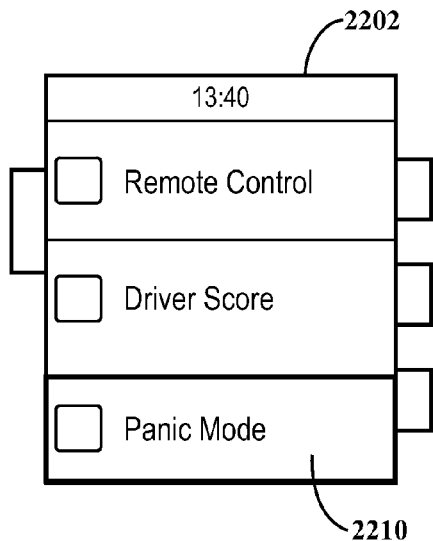
FIGS. 25A-25C are examples screens of the panic mode for the example wearable article in FIGS. 22A-22C.
Figure 25B:
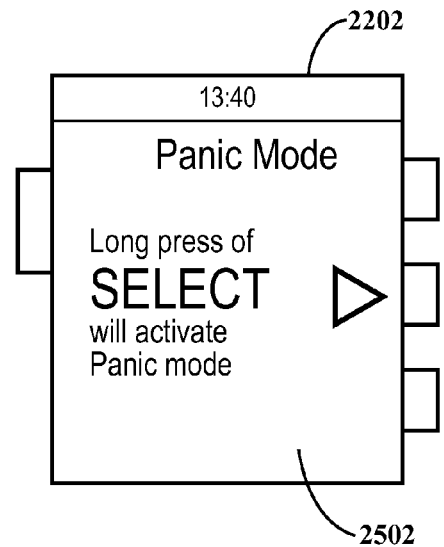
Figure 25C:
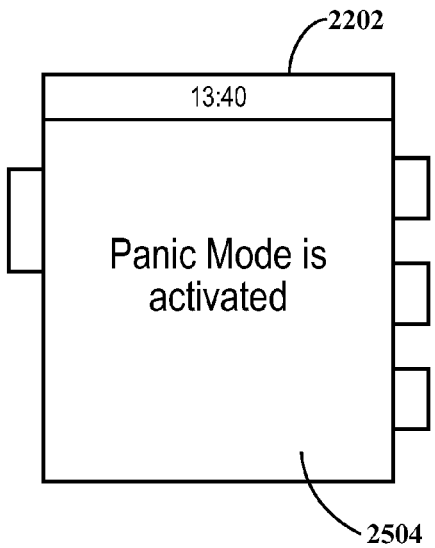

FIGS. 25A-C are example screen displays for the panic mode of the vehicle application 2204 on the wearable article 2200. FIG. 25A illustrates the main menu where the panic mode icon 2210 can be selected. FIG. 25B illustrates a screen 2502 where the user is indicated to long press the select button to activate the panic mode. FIG. 25C shows a message 2504 indicating the panic mode has been activated.

As illustrated in FIGS. 22A through 25C, vehicle functions to be performed on the vehicle 20 can include various remote control functions (FIGS. 23A-F), driver score function (FIG. 24B), and panic mode (FIGS. 25A-C). The remote control functions can include, for example, unlocking, locking (2308 in FIG. 23A), switching on flashlight (2310 in FIG. 23A), switching off flashlight, horn honk (2312 in FIG. 23A), starting (2302 in FIG. 23A), stopping (2306 in FIG. 23C), powering on, or powering off of the vehicle. Other vehicle functions can include, for example, a navigation function, an audio/video function, a climate control function, or an internet access function.

The wearable article can be used to sense information from a user, such as biometrics and driving information. For example, the wearable article 61 can be used to store and forward a driver score. When the driver keys off the vehicle 20, the driver score can be sent from the vehicle 20 to the wearable article 61. After a certain time interval, the wearable article 61 can upload the driver score to a remote server or cloud 70, which can perform further analysis on the driver score to help the driver improving driving skills and become a safer driver. As previously discussed, data analysis based on the driver scores can be used to improve safe driving skills or for other purposes. For example, the user can review and evaluate his driving performances relative to others in a social ranking system based on the driver scores.

In some embodiments, a driver score can be generated for driver actions performed on the vehicle 20. The driver score can be used to help the driver improving driving skills and alert the driver when deteriorating performance occurs. The driver actions can be associated with or triggered by the vehicle functions performed on the vehicle 20. The driver score can be calculated based on, for example, information from a sensor such as a motion camera or light sensor that detect gesture commands, an onboard device, and/or the wearable article 61. For example, once the vehicle is started, information about driver actions can be gathered for calculating the driver score. Once the vehicle is stopped and locked, the driver action information gathered during this trip can be used to calculate the driver score. In case the driver score is calculated by a device other than the wearable article 61, it can be transmitted to the wearable article 61 for display and/or storage.

Figure 22C:
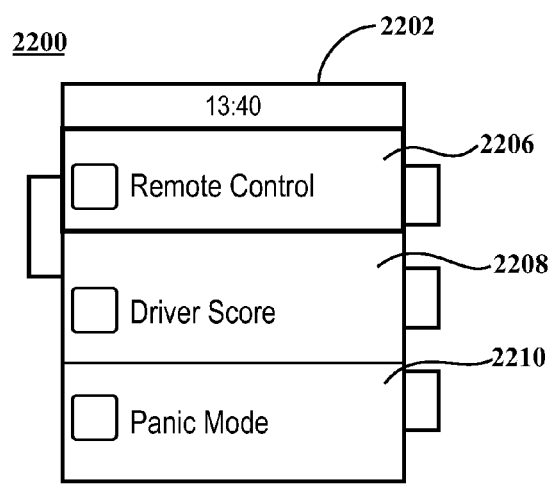

In one implementation, the driver score can be an option selectable from the menu screen of the wearable article. As shown in FIG. 22C, driver score option 2208 can be selected on the menu screen 2202 of the wearable article 2200. Referring to FIG. 24B, an example driver score of "87" is generated and displayed on a driver score alert screen 2404 when the driver score option 2208 is selected. As previously discussed, the driver score can be uploaded and further processed for various applications-specific purposes such as to improve driving skills.

The wearable article 61 can also be used to control multiple vehicles, or to allow multiple users to share control of a vehicle. As will be described, encryption techniques may be implemented on the wearable articles and/or some of the vehicle subsystems for security purposes.

In some instances, at least one onboard input sensor 60 or offboard input device can be integrated into, or operate in conjunction with, the interactive display subsystem 32. In one non-limiting example, the interactive display subsystem 32 includes an LCD display integrated into a window 22 and can operate in conjunction with one or more touch sensors integrated into the window 22, causing the window to function as a touchscreen. In another non-limiting example, the interactive display subsystem 32 includes a projector 42 and coating 40 on the window 22 and can operate in conjunction with one or more motion detectors configured to detect user gesture commands, causing the window to operate as a gesture-based interactive display. Subsystem combinations involving the interactive display subsystem 32 and the user input subsystem and enabling user interaction with a display on a vehicle window 22 will be referred to herein as an interactive window display.

Figure 4:
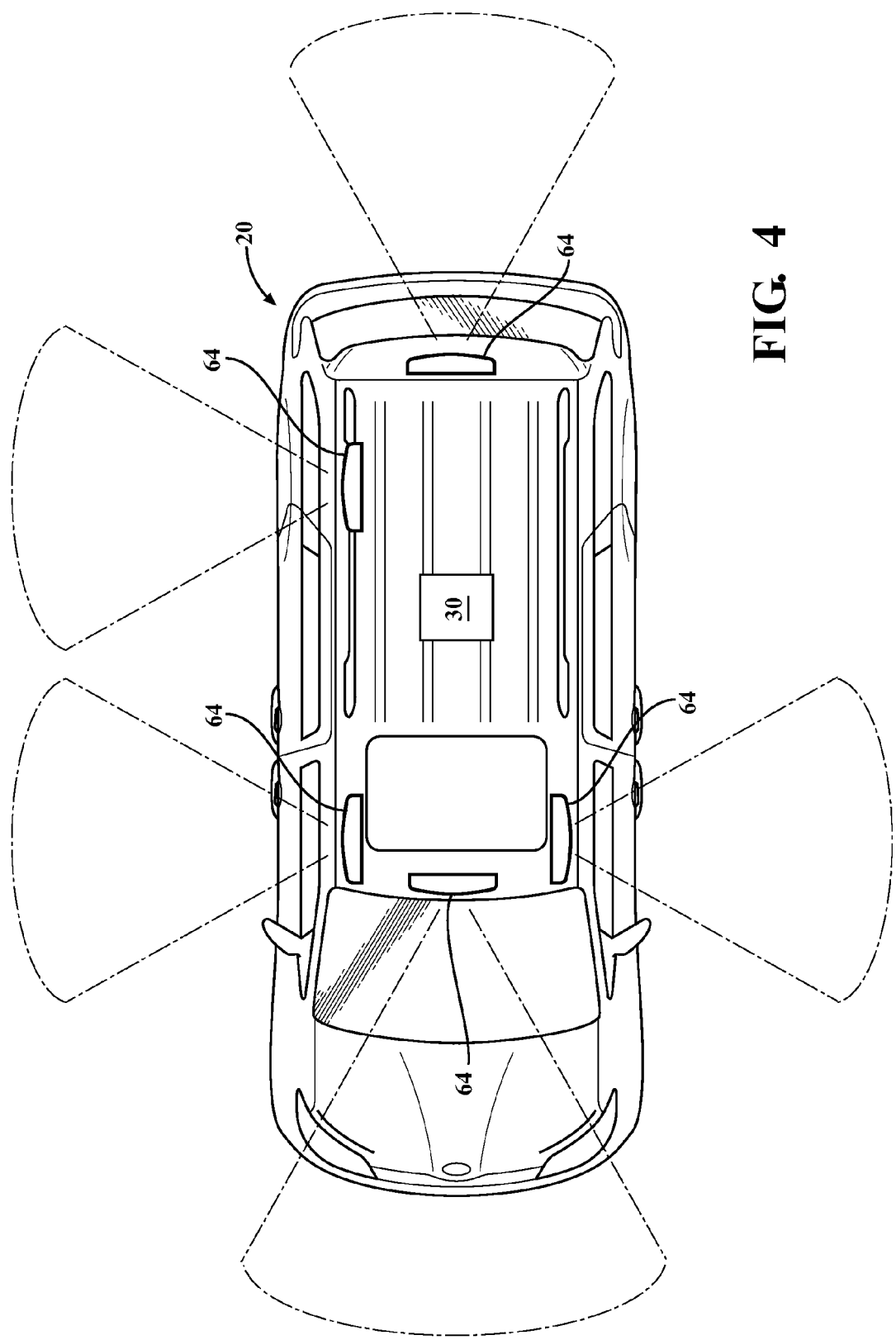
FIG. 4 is a top view of the vehicle illustrating an exterior user identification subsystem of the interactive vehicle window display system.

The user identification subsystem 38, also referred to herein as the user recognition and authentication subsystem, includes one or more identification sensors 64 such as a closed-circuit television (CCTV) camera, infrared, thermal or other sensor mounted to the vehicle 20 to provide a desired field of view external to the vehicle 20 as shown in FIG. 4, internal to the vehicle, or both. One example user identification subsystem 38 can recognize the driver and/or passenger based on image data captured by identification sensors 64, e.g. a skeletal joint relationship 66 and/or other user form data (FIG. 5), separate from, or along with, wireless devices such as the wearable article 61 associated with that particular driver and/or passenger. The wearable article 61 can also include a sensor (not shown) to take sensed information from the user, such as pulse or heart rate. The sensor on the wearable article 61 can be, for example, a wrist-mounted sensor that recognizes the user based on voice commands, ultrasound, gesture or other inputs. Based at least in part on this identification, the system 30 provides access to interactive interfaces on the interactive display subsystem 32 associated with the particular driver and/or passenger.

FIG. 21 is a flow diagram of an example process 2100 performed by the wearable computing device 1000 of FIG. 19. Process 2100 can be implemented as a software program executed by computing device 1000. The software program can include machine-readable instructions that may be stored in a memory such as memory 1104, and that, when executed by a processor, such as CPU 1102, may cause the wearable computing device 1000 to perform process 2100. Process 2100 can also be implemented using specialized hardware or firmware.

At a step 2102, a user input indicative of a vehicle function to be performed on the vehicle can be received on the wearable article, such as the wearable computing device 1000. In one example, the user can press on a touch button on a display of the smart watch 2002 to activate the vehicle function to unlock the front door of the vehicle 20. In another example, the user can select a vehicle function by pressing an icon on the smart clothing article 2004 worn by the user. The user input can also include, for example, an indication to activate the window display in the interactive display subsystem. Other types of inputs are also possible. For example, the user can use voice commands to activate the vehicle functions.

At a step 2104, a gesture input by the user can be received at the wearable article such as the wearable computing device 1000. The gesture input can be used for authentication of the user. In some embodiments (e.g., the multi-factor authentication), the gesture input can be used in the multi-factor authentication in conjunction with the user input received from the wearable article at step 2102 to authenticate the user. The user can be authenticated based on a first input received from the wearable article indicating a vehicle function to be performed and a second gesture input detected by a sensor. The sensor can be, for example, coupled to the vehicle 20 or to the wearable article 61. The sensor can also be integrated with the vehicle 20 or the wearable article 61. For example, the sensor can be an onboard input sensor, such as a camera or light sensor configured to detect gesture commands, or a microphone configured to detect voice commands. The sensor can also be an offboard input device coupled with the wearable article 61, or another device, such as key fob 62 or personal electronic device 63.

In some embodiments, the second input can include a gesture input by the user detected by the sensor when the user is within a predetermined range of the vehicle 20. The sensor can be used to detect whether the user is wearing the wearable article. When the user is not wearing the wearable article, access to some or all vehicle functions can be denied.

At a step 2106, a vehicle function can be performed on the vehicle 20 based on a successful authentication of the user. The vehicle function can be one indicated at step 2102, such as, for example, an input indication to unlock or switch on the vehicle 20. As shown in the examples of FIGS. 22A through 25C, the vehicle functions can include various remote control functions, a driver score function, and a panic mode. The remote control functions can include, for example unlocking, locking, switching on flashlight, switching off flashlight, horn honk, starting, stopping, powering on, or powering off of the vehicle. The vehicle functions can also include a navigation function, an audio/video function, a climate control function, or an internet access function.

Information used for user authentication can include user input received at step 2102, the gesture input received at step 2104, or any of the multi-factors described above. Example multi-factor authentication may include receiving inputs from the wearable article 61, the key fob 62, skeleton joint relationship recognition (FIG. 5), and/or a gesture password (FIG. 8). The user may be provisionally identified with one of these factors, but may require a total of at least two factors to perform some or all of the vehicle functions.

After the user is successfully authenticated, the control signal for performing the vehicle function indicated at step 2102 can be generated and sent to the vehicle 20. Once successfully authenticated, the user can interact with the display subsystem through the integrated wearable article 61 and output can be generated for display on the vehicle window.

The system 30 can store user profiles of known users, the user profiles including identification information relevant to individual users. For example, a user profile can contain skeleton joint relationship data or facial recognition data useable by the user identification subsystem 38 to identify or authenticate a user. A user profile can additionally contain personal interest information, such as personal calendar and event information, driving/destination history, web browsing history, entertainment preferences, climate preferences, etc. In some variations, any or all information contained in a user profile can be stored on or shared with the wearable article 61, a personal electronic device 63, remote server, or other cloud 70 based system. Such offboard storage or sharing of user profile data can facilitate utilization of user profile data in other vehicles such as any additional vehicles owned by the user, rental vehicles, etc. Such user profile data can be secured by being accessible through a password protected application running on the cloud 70 based system, by biometric authentication, or by other effective means.

In some instances, a user profile can additionally contain user access information; data pertaining to whether the user is allowed to control a given vehicle function. For example, the user profile associated with a user can indicate full user access, or function control rights for that user. This can be analogous to the control rights of the administrator of a personal computer. A user profile can alternatively indicate restricted user access. For example, the user profile associated with a child can be set to block the user from accessing certain audio or video controls, the navigation system, altering user profiles, or the like.

Registration of various user profiles with the system 30 can be completed in any manner, for example, over the internet or with a direct vehicle interface. User profiles can be based on the identities of individual users known to or registered with the system, or to user categories, such as "unknown user", or "valet". In different variations, a default user category such as "unknown user" or "valet" can be associated with limited, default access, or can be associated with no access, i.e. complete prohibition of access to the system 30.

The user location subsystem 39, operable to determine the location of one or more users inside or outside the vehicle, includes one or more location sensors 66 such as a pressure sensor, temperature sensor, or camera deployed inside or outside the vehicle. In some cases, a device can serve as both an identification sensor 64 and a location sensor 66. For example, a camera mounted within the vehicle can provide information on a user's specific identity, by means described above, and on the user's location within the vehicle, such as the driver's seat or the front-row passenger's seat. In some cases, elements of the interactive display subsystem 32 can also operate as location sensors 66 within the user location subsystem 39. For example, pressure sensors within a smartscreen or motion detectors operating as part of an interactive display can be used to obtain user location information.

In some instances, user access can be based on user location as determined by the user location subsystem 39. For example, second or third row passengers can be allowed or disallowed access to various vehicle functions such as the navigation system. Optionally, a user with a user profile that is associated with unlimited access per the access information associated with the user profile can specify such settings. In some instances, user access can be based on a combination of the user profile as applied by the user identification subsystem 38, and the user location as detected by the user location subsystem 39. For example, a user with unlimited access as specified by the applied user profile can nonetheless be blocked from accessing certain vehicle functions when occupying the driver's seat of a moving vehicle.

Figure 6:
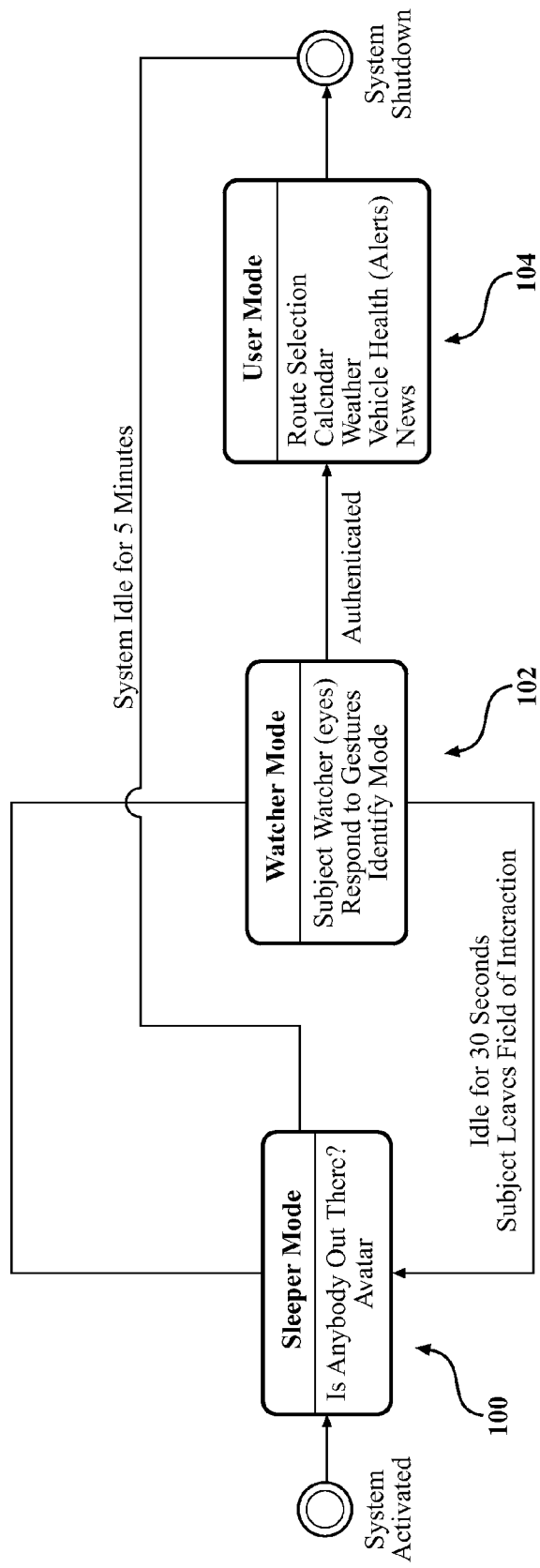
FIG. 6 is a schematic block diagram of an algorithm for operation of the system according to one non-limiting embodiment.

With reference to FIG. 6, operation of the system 30 according to one disclosed non-limiting embodiment generally includes a sleeper mode 100, a watcher mode 102 and a user mode 104. It should be appreciated that other modes may additionally or alternatively be provided.

If the system 30 is active but has yet to detect a user, the system 30 will be in sleeper mode 100 until awakened by the user identification subsystem 38. After detection but prior to identification by the system 30, the watcher mode 102 may be utilized to interact with authenticated as well as unauthenticated persons. For example, when a person approaches the vehicle 20, the system 30 recognizes the direction from which the person has approached then activates the interactive display subsystem 32 to display an avatar, eyes or other graphic. The graphic may be directed specifically toward the direction from which the person approaches, e.g., the graphical eyes "look" toward their approach. Alternatively, an audio capability allows the system 30 to respond to commands and initiate interaction from a blind side of the vehicle 20, i.e., a side without the interactive display subsystem 32. The watcher mode 102 utilizes the user identification subsystem 38 to discriminate between authenticated and un-authenticated persons.

The user mode 104 allows a user with a known operator and/or passenger user profile in the system 30 to make decisions on approach to the vehicle 20 so that so that certain vehicle interactions need not await entry into the vehicle 20. The user mode 104 reduces distractions through the reduction of travel-associated decisions from the driver's cognitive, visual and manual workload streams once within the vehicle 20. In furtherance of this, the user is presented with an overview of information to include, for example, weather, traffic, calendar events and vehicle health. As will be further described, predictive functions of the system 30 identify likely actions, and offer optimal paths to completion, such as planning an efficient route.

A maximum range of content provision by the interactive display subsystem 32 may be associated with a maximum distance at which that content can be effectively interacted with by the user. In one disclosed non-limiting embodiment, the maximum range of each content feature is prioritized with respect to legibility range of content displayed by the interactive display subsystem 32. This range metric facilitates the determination of the order in which content appears in the walkup experience. Access to prioritized content with greater maximum range allows the walkup experience to begin further from the vehicle 20 to provide the user with more overall time to interact with the system 30.

Once successfully authenticated, the interactive display subsystem can also enable the user to interact with the display subsystem through the integrated wearable article 61 and generate output for display on the vehicle window.

Figure 9:
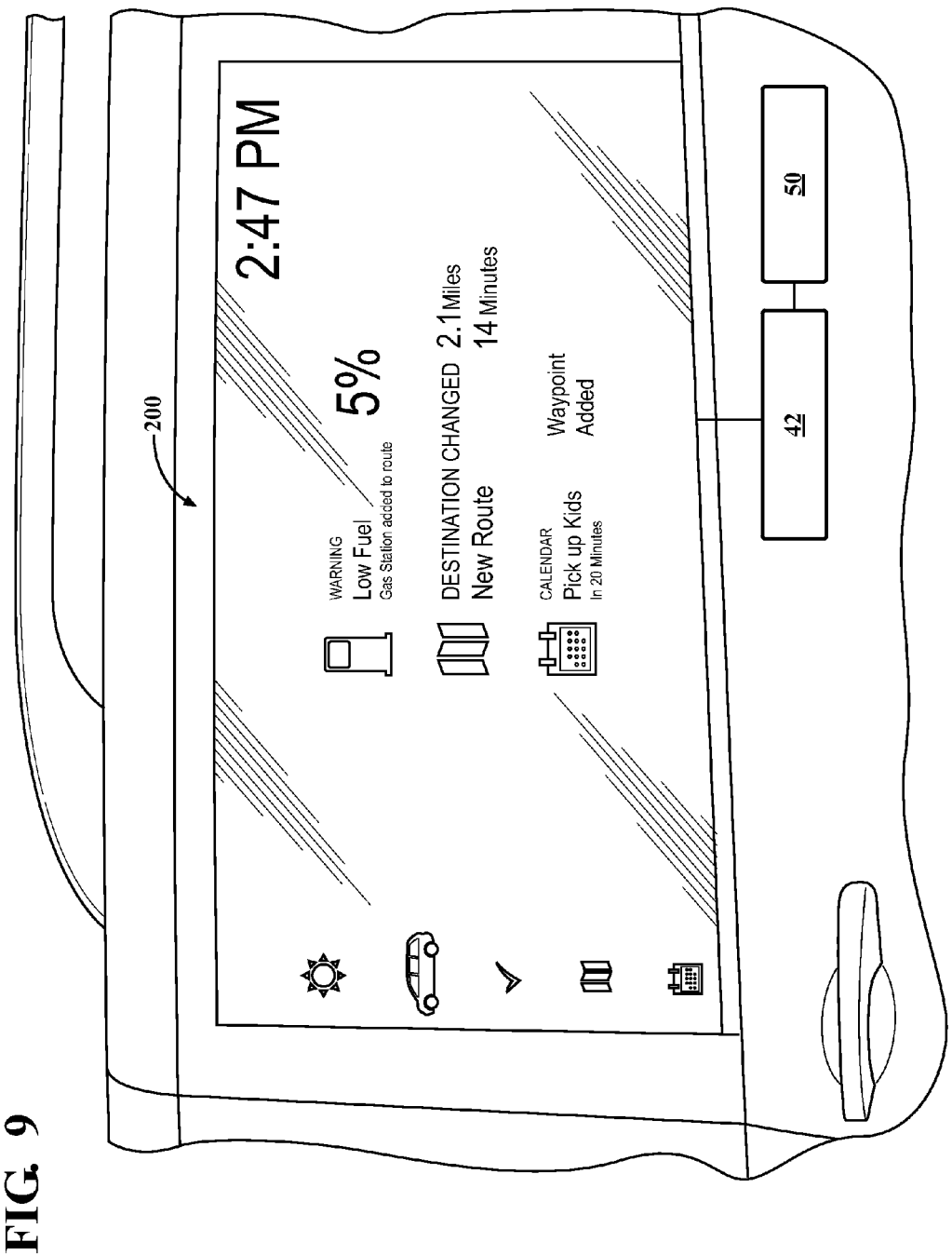
FIG. 9 is an example landing page displayed by the interactive vehicle window display system.

With reference to FIG. 9, once authenticated, the "landing" or "home" page 200 provides a summary of alerts and important information to the user. The landing page 200 provides the user with a readily reviewable overview of the status of the vehicle and how it may affect his schedule and activities. In this example, the content includes time information, vehicle diagnostic information, and personal calendar information. Here shown, a low fuel warning is provided in addition to a traffic-based route update for use by the vehicle navigation system and a calendar event reminder to "Pick up Kids in 20 minutes." In another example, the system 30 will include a fuel station as a stop during route guidance if the destination is a distance greater than the available fuel range. Notably, preferred fuel stations or other stops may be predefined in the user profile.

The landing page 200 further displays a plurality of icons to indicate additional content pages that can be viewed by the authorized user. The landing page 200 itself may be accessed on each content page as an icon such as a vehicle manufacturer mark icon on each content page. The landing page 200 allows the authorized user to understand what vehicle systems or personal user profile items may require further attention and provides access to additional content feature details with regard to these items in the form of navigable icons that lead to additional content pages. The landing page 200 can additionally or alternatively integrate an interactive display, for example, a smart page or video game. Other interactive vehicle display page configurations are also possible.

Selection of content is accomplished with, for example, wearable article 61, the key fob 62, user gestures, voice commands, touch inputs, etc. In one example, the user utilizes the input of the wearable article 61 to cycle through various pages displayed by the interactive display subsystem 32. In one example, the wearable article 61 may include a four button directional pad and two auxiliary buttons. Alternatively, hand gestures may be used to "swipe" between pages. In another example, the user can utilizes the key fob 62 to cycle through the pages. It should be appreciated that although particular pages are illustrated in the disclosed non-limiting embodiment, various alternative or additional pages may be provided.

Figure 10:
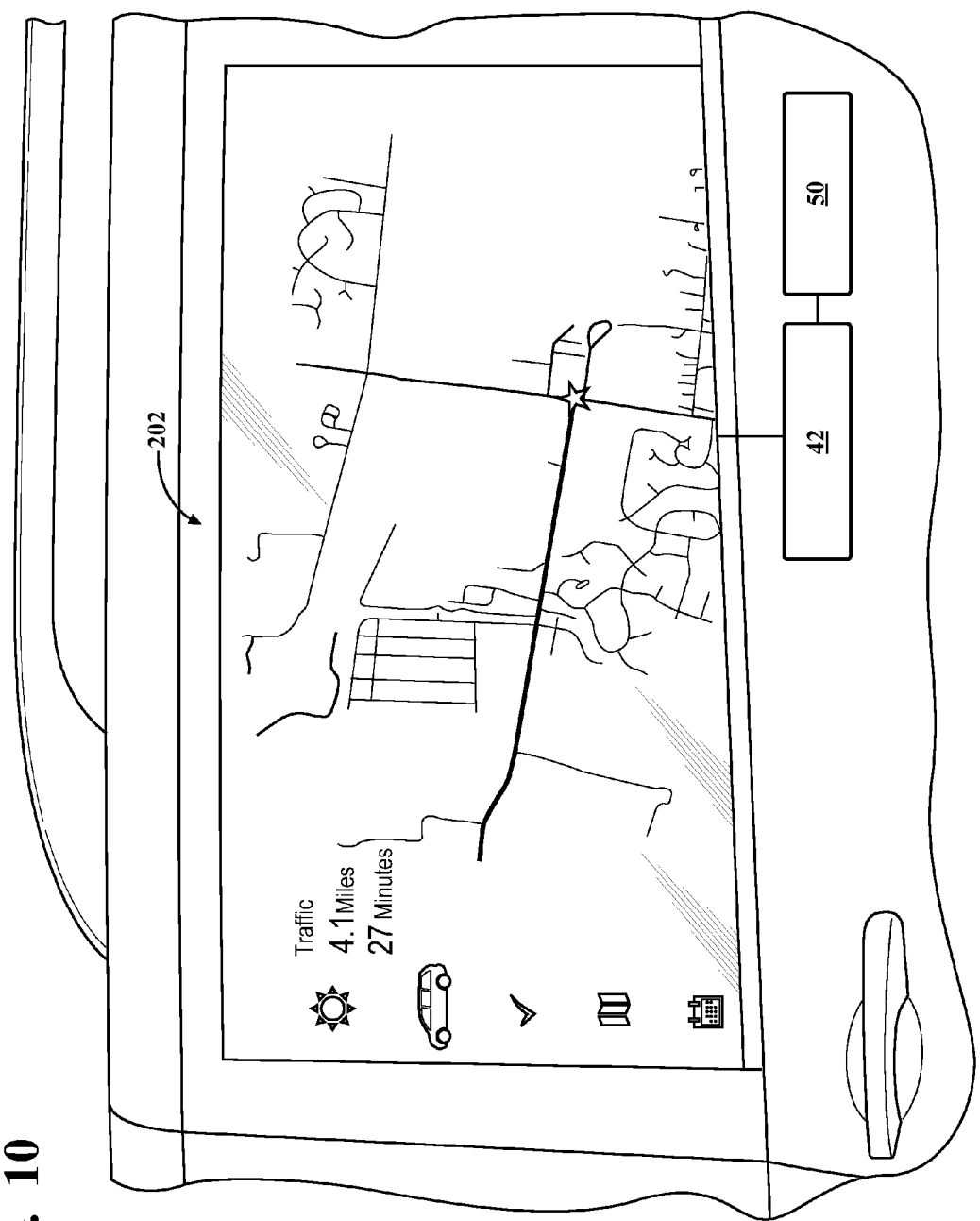
FIG. 10 is an example route page displayed by the interactive vehicle window display system.

With reference to FIG. 10, a route page 202 defaults to the predicted best route for the user with respect to an explicit or inferred next destination. Any alternate destinations or routes that can be explicit or inferred with confidence from, for example, a user personal electronic device such as the wearable article 61, are presented to permit user selection by scrolling through the options. The suggested route screen is here shown accessed using the folded-map icon, however, other icons may be utilized.

Figure 11:
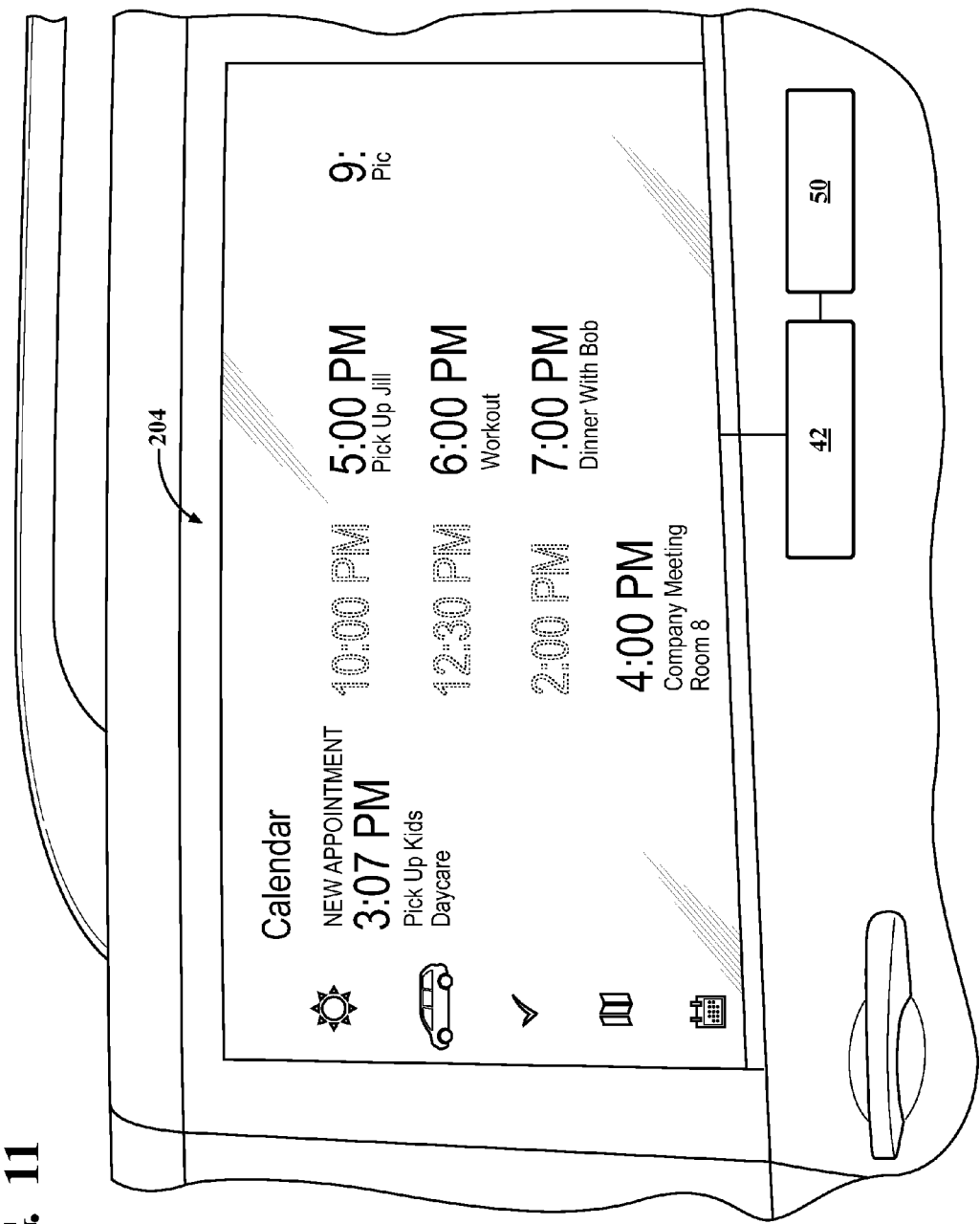
FIG. 11 is an example calendar page displayed by the interactive vehicle window display system.

With reference to FIG. 11, a calendar page 204 displays the user's calendar. In this example, the view is near-term, and shows only the next 2-3 upcoming appointments. If the event includes location information the user is also given the option to use the event for destination selection. Here shown, the calendar page 204 provides content with respect to the next appointment highlighted for the user and provides a reminder to "Pick Up Kids." The calendar screen is here shown accessed using a flip calendar icon, however, other icons may be utilized.

Figure 12:
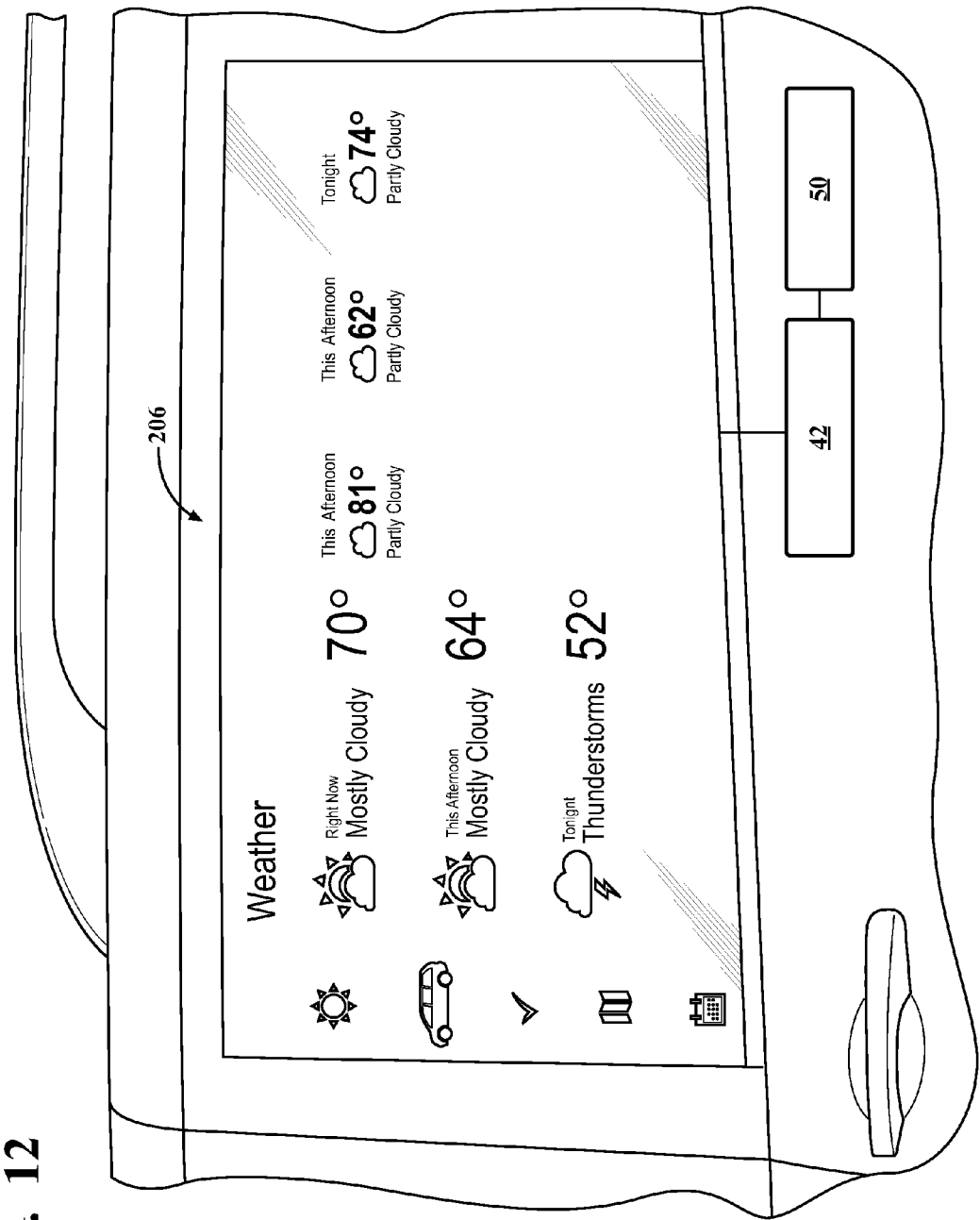
FIG. 12 is an example weather page displayed by the interactive vehicle window display system.

With reference to FIG. 12, a weather page 206 leverages information about the route to provide relevant weather information—this may be especially effective when the user is travelling away from home. For example, the system 30 determines whether it is more valuable to present the user with local weather information, destination weather information, or both, depending on the settings selected by the user or the type of weather information available. Here shown, the weather forecast is chronological. The weather page 206 can be accessed with a sun icon, however, other icons may be utilized. In addition, weather conditions can be utilized to generate a reminder for display on the landing screen 200 that, for example, suggests an umbrella be placed in the vehicle if rain is forecasted.

Figure 13:
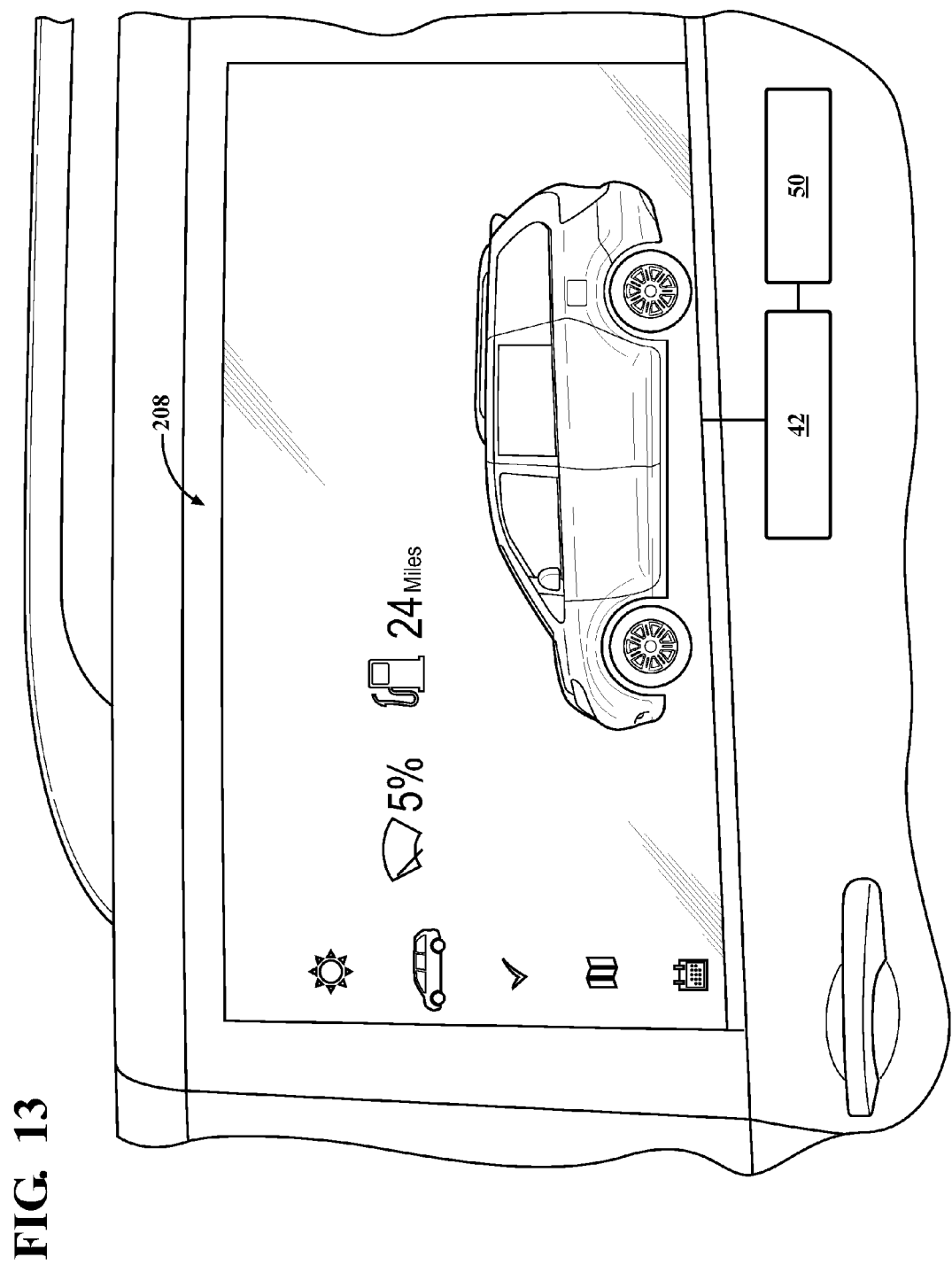
FIG. 13 is an example vehicle status page displayed by the interactive vehicle window display system.

With reference to FIG. 13, a vehicle status page 208 provides the user with a view of impending vehicle maintenance needs that requires attention. Notifications can include source details of the notification, severity, and options to resolve the potential issue. For example, given the notification of "Low Fuel," the system 30 can suggest a route to a nearby fuel station within the range of the vehicle. The vehicle status page 208 is here shown accessed with a vehicle icon, however, other icons may be utilized.

Figure 14:
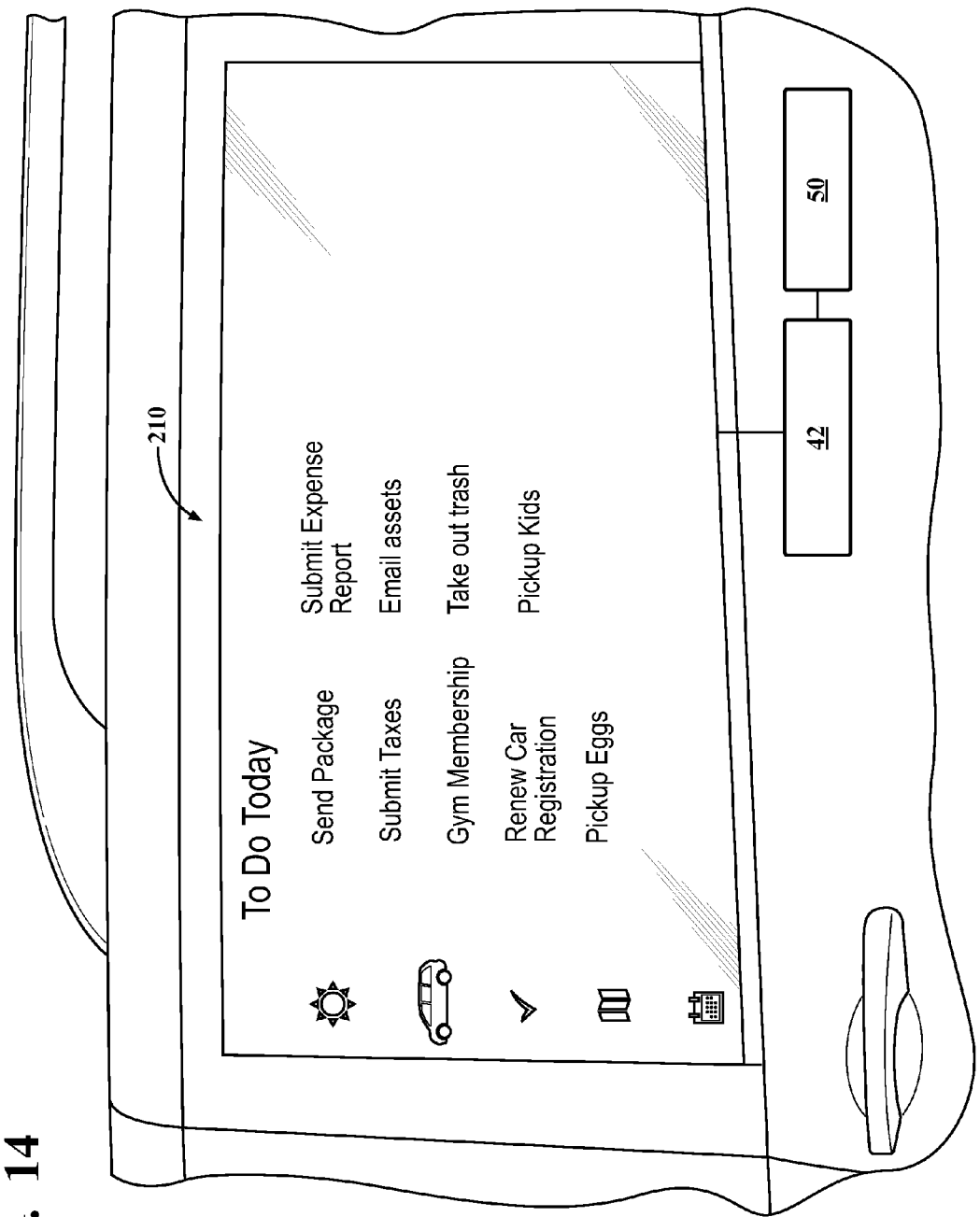
FIG. 14 is an example to-do page displayed by the interactive vehicle window display system.

With reference to FIG. 14, a to-do list page 210 presents the authorized user with information from any associated to-do list available on, for example, that user's personal wearable device 61. Here shown, the recognized user is tasked to "Send Package," "Submit Taxes," and "Renew Car Registration," among other items. The to-do list page 210 can alternatively be integrated into the route selection page if location information is included in a given list item in the personal electronic device to-do list. An example of this integration includes the provision of route details to a dry cleaner if the dry cleaning pickup is on the to-do list and the current route is proximate to the location of the dry cleaner location. The to-do list page is here shown accessed using a check-mark icon, however, other icons may be utilized.

As noted above, information of this nature, which can be included in a user profile, can in some variations be stored on or shared with wearable device 61, another a personal electronic device 63, remote server, or other cloud 70 based system, facilitating utilization in more than one vehicle. Any such information can be secured by being accessible through a password protected application running on the cloud 70 based system, by biometric authentication, or by other effective means. In some such variations, a first user can be granted partial or complete access to a second user's profile by password sharing, for example. Such sharing of access could enable a first user to write reminders or tasks from a remote location to the user profile of a second user, such as a family member, such that the reminders or tasks written by the first user will be displayed on a window when the second user approaches or enters the vehicle, or any vehicle equipped with system 30 enabled to access the user profile of the second user.

Figure 15:
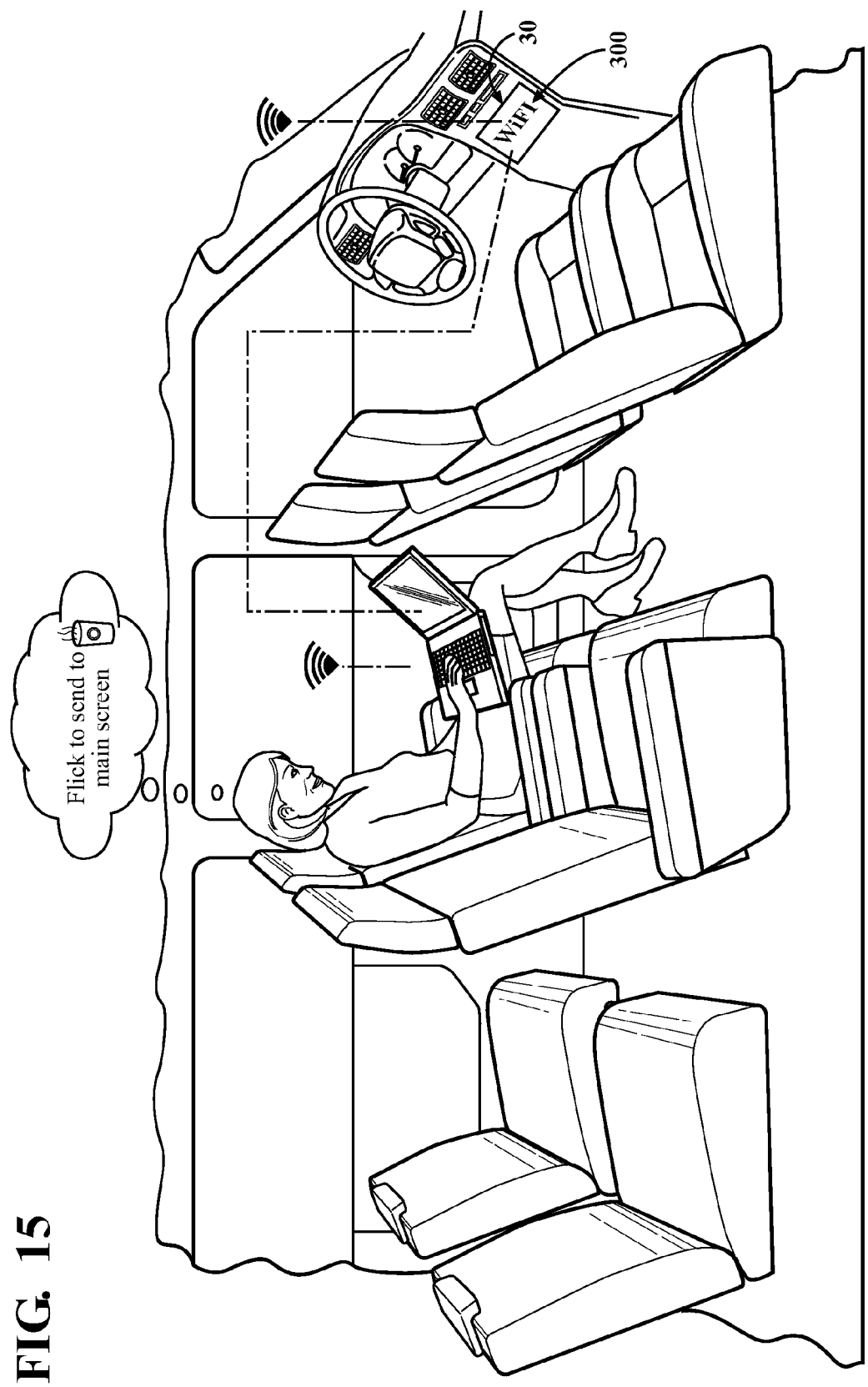
FIG. 15 is a partial interior view of a vehicle cabin illustrating an interactive environment for the driver and/or passengers to utilize functionalities of a vehicle head unit.

With reference to FIG. 15, user access to various vehicle functions can include direct or remote access to utilize functionalities of a vehicle head unit 300.

With the interactivity between the vehicle head unit 300 and the system 30, and in particular between the vehicle head unit 300 and various interactive window displays, passengers can make selections with regard to vehicle systems typically performed by driver and in some cases only when the vehicle is stationary. Allowing only passengers to interact with certain vehicle systems while the vehicle is in motion increases safety by minimization of driver distraction. Passenger interaction can also enable greater functionality for the system 30. For example, a front-seat passenger can be offered more menu selections than the driver, while 2nd and 3rd row passengers can be offered even greater menu selections than the front-seat passenger. In these embodiments, the passengers can take over portions of the driver workload.

The vehicle passengers may, for example, interact with the system 30 and thereby the vehicle head unit 300 via an interactive window display or through the wearable article 61 which communicates therewith, through Bluetooth, RFID or other wireless technology standards to exchange data. Further, the system 30 may permit the formation of personal area networks (PANs) for vehicle passengers to share information. For example, a passenger's wearable article 61 may include a mapping app operable to communicate with the vehicle navigation system on the vehicle head unit 300 with no features locked out such that the passenger can search destinations and selectively send to the vehicle navigation system via the vehicle head unit 300.

Interaction of the system 30 with the vehicle head unit 300 also allows the driver and/or passengers to select content for other vehicle passengers and/or the driver. For example, one of the passengers can select a destination to display on the navigation system for the driver while the vehicle is in motion. In another example, the driver can select entertainment content for display to child passengers. In yet another example, the passenger can control infotainment or climate control features controlled by the vehicle head unit 300.

Figure 16:
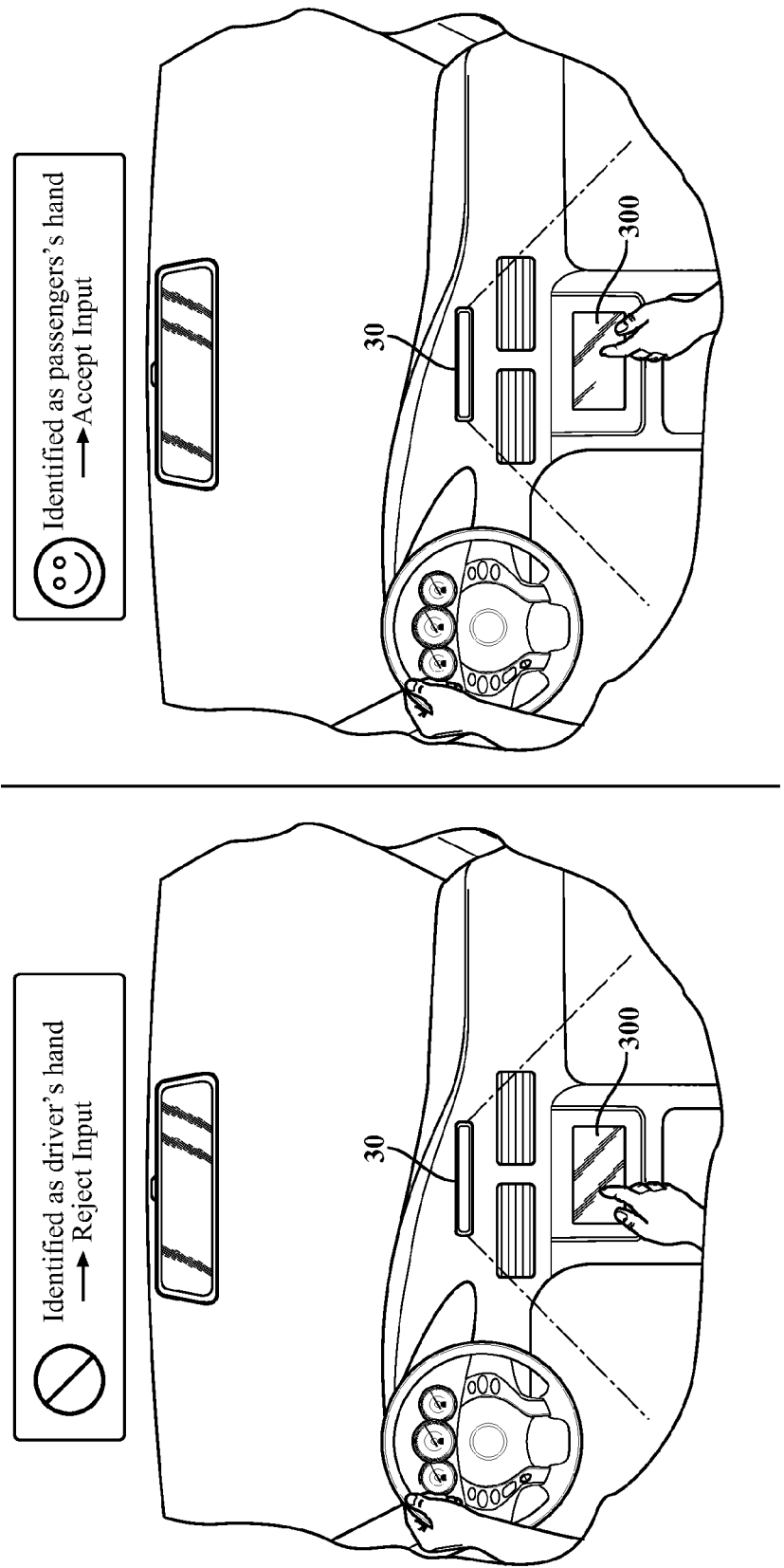
FIG. 16 is a partial interior view of the vehicle cabin illustrating discrimination of a driver and/or passenger to selectively permit utilization of functionalities of a vehicle head unit during vehicle operation.
Figure 17:
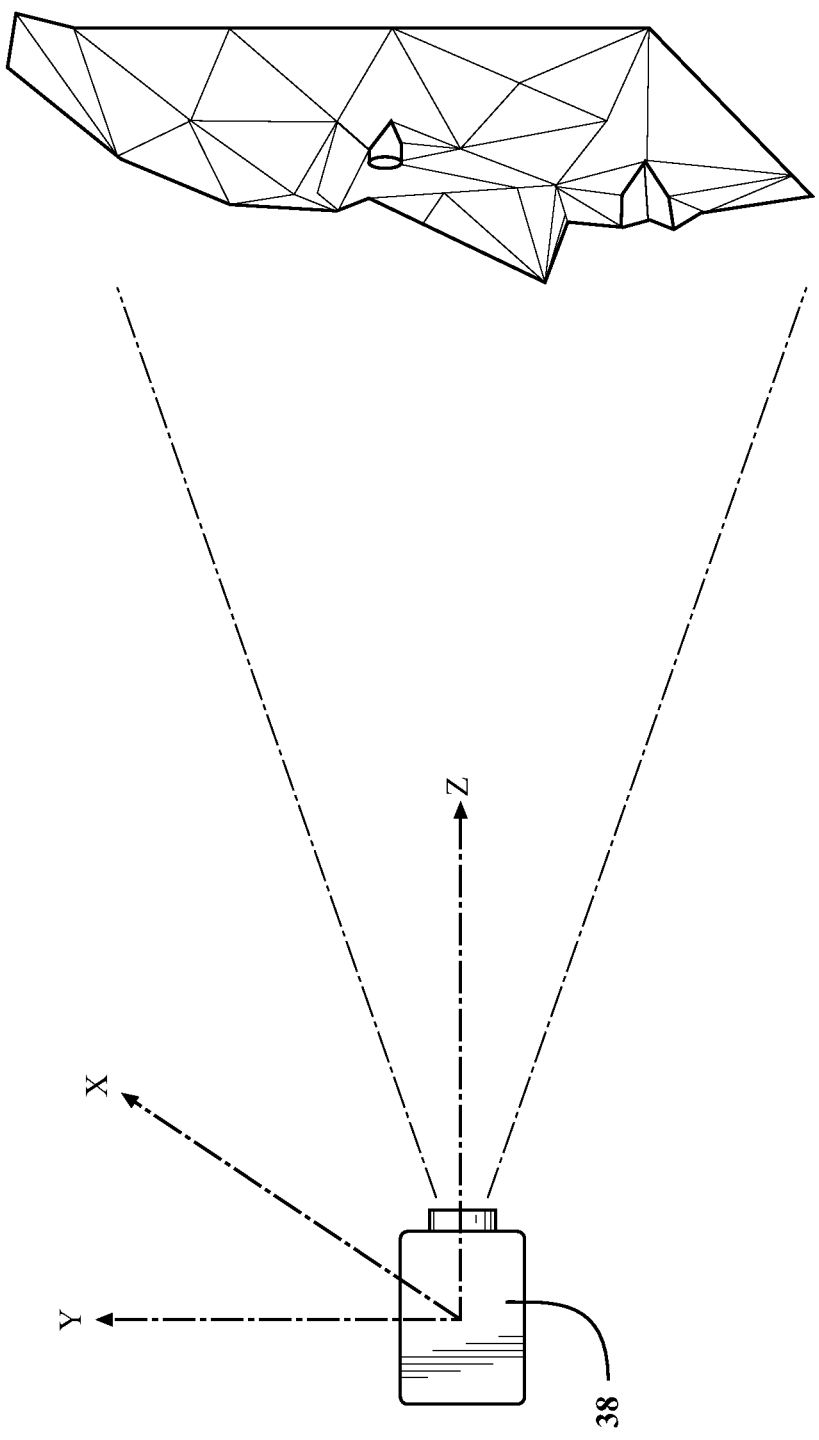
FIG. 17 is a pictorial representation of a vehicle passenger facial map for use with the system to track occupant location.
Figure 18:
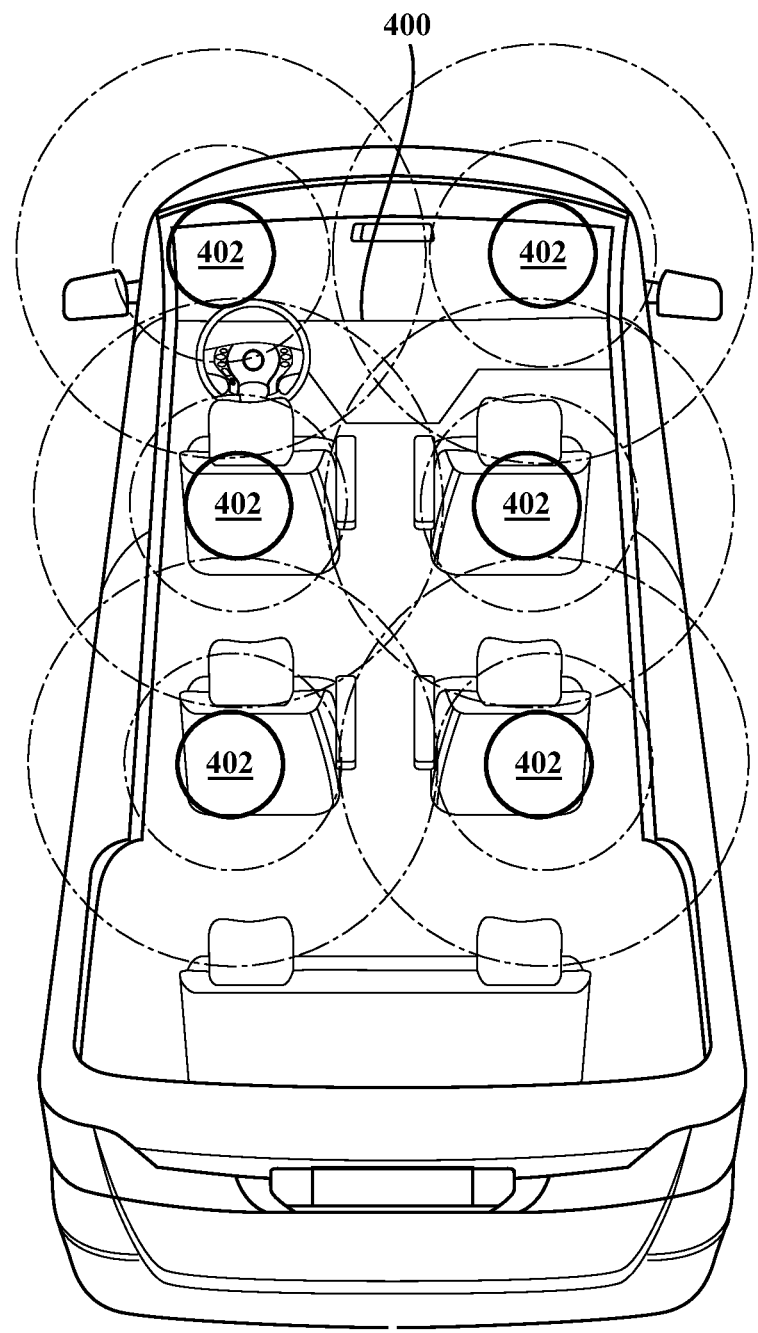
FIG. 18 is an overhead interior view of the vehicle illustrating a sensor arrangement to track occupant location within the vehicle cabin.

With reference to FIG. 16, and in one non-limiting example of the operation of the user location subsystem 39, to still further increase safety through driver distraction minimization, the system 30, by utilizing user location subsystem 39, is operable to track the location or position of the vehicle occupants within the vehicle cabin 400 (FIG. 18) through skeletal position (FIG. 16), facial map data (FIG. 17), pressure sensors, interactive window display input sensors, or others. For a three row vehicle, for example, three distinct areas are tracked—front row, middle row and rear row. Typically, at least two sensors 402 per row are required to track a state of each occupant within the vehicle 20. In some instances, each individual seat in the vehicle 20 can be tracked. The data from all sensors 402 may alternatively or additionally be combined to create one central map (2D or 3D) for use by the system 30. It should be appreciated that the sensors 402 may communicate with, or be a portion of, the user identification subsystem 38, the user location subsystem 39, or both.

Given that the vehicle occupants are typically seated and belted, the multi-point skeletal joint relationship and facial recognition map data provides a relatively accurate position of each occupant captured on an XYZ axis map that can track, to a desired level of precision, the state of each occupant at a specific snapshot in time. The state of each occupant facilitates further tailored operations for various vehicle functions. For example, the user location subsystem 39 detects and discriminates between a driver's hand from that of a vehicle front row passenger hand to selectively unlock various head unit functionality such as navigation route selection (FIG. 16). Dependent, for example, on which user (driver or passenger) is attempting to access the system 30 and whether the vehicle is in motion, content menu items of the vehicle head unit 300 are selectively displayed. For example, certain content such as route selection may be color coded for only passenger access, while other content such as zooming and scrolling may always be available regardless of user.

Upon approach to the vehicle, the system 30 beneficially recognizes a user with a first and second point of identification to display information for that particular, authorized user. This authentication process ensures the security of the vehicle and the personal information embedded in the system 30 yet permits vehicle interaction prior to user entry into the vehicle cabin. The system 30 also beneficially discriminates passengers from the driver to selectively permit access to personalized content or specific vehicle system interfaces.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. For example, in the embodiments described above, the vehicle 20 is generally described as an automobile. However, the vehicle 20 is not limited to an automobile, as the integrated wearable article can also be implemented with other vehicles generally controlled by a driver, or operator, such as airplanes, boats etc. In addition, the vehicle 20 need not be limited to one controlled by a driver or operator, and could be one or more robots or robotic tools performing operations under the control of an equivalent application to a path planner application. It is therefore to be appreciated that within the scope of the appended claims, the disclosure may be practiced other than as specifically described. For that reason the appended claims should be studied to determine true scope and content. The scope of the claims is thus to be accorded the broadest interpretation so as to encompass all such modifications and equivalent structures as is permitted under the law.

What is claimed is:

1. A system for operating a vehicle, comprising:
    a wearable article comprising at least one input device configured to receive a manual input from a user, the wearable article configured to transmit an instruction for remote control of a vehicle function in response to the manual input;
    a user recognition and authentication subsystem configured to:
        first, pre-authenticate a user, based on a first authentication factor that the user recognition and authentication subsystem detects when the user is located at a first position, outside of and spaced apart from the vehicle, and when the user is wearing the wearable article; and
        second, authenticate the user, based on a second authentication factor that the user recognition and authentication subsystem detects when the user is located at a second position, outside of and spaced apart from the vehicle, the second position being nearer to the vehicle than the first position;
    an interactive display subsystem configured to generate a first output for display on a vehicle window in response to the pre-authentication and to generate a second output for display on the vehicle window in response to the authentication, the second output based, at least in part, on personal information stored in a user profile; and
    a control subsystem configured to receive the instruction and, if the user is pre-authenticated and authenticated, execute the instruction for remote control of the vehicle function.

2. The system of claim 1, wherein the wearable article comprises at least one of a smart watch, a personal mobile device, a smart clothing article, a transdermal chip, a wearable sensor, or a smartglasses article.

3. The system of claim 1, wherein the wearable article comprises a wearable computing device configured to perform at least one vehicle function on the vehicle.

4. The system of claim 3, wherein the at least one vehicle function is at least one of a remote control function, a driver score function, a panic mode function, a navigation function, an audio or video function, a climate control function, or an internet access function.

5. The system of claim 4, wherein the remote control function is one of unlocking, locking, switching on flashlight, switching off flashlight, horn honk, starting, stopping, powering on, or powering off of the vehicle.

6. The system of claim 1, wherein the user recognition and authentication subsystem comprises a sensor configured to detect at least one gesture input by the user.

7. The system of claim 6, wherein the user is authenticated based on a first input received from the wearable article indicating a vehicle function to be performed and a second input detected by the sensor associated with the vehicle or the wearable article.

8. The system of claim 6, wherein the sensor is further configured to detect whether the user is wearing the wearable article, wherein the user is authenticated based on the at least one gesture input by the user detected within a predetermined range of the vehicle.

9. The system of claim 3, further comprising:
    a control subsystem configured to enable the user to control the at least one vehicle function from the wearable article.

10. The system of claim 9, wherein the control subsystem is further configured to:
    generate a driver score for at least one driver action associated with one or more vehicle functions performed by the user on the vehicle; and
    transmit the driver score to the wearable article.

11. A wearable article for remote authentication of a user of a vehicle, the wearable article comprising:
    a sensor to determine whether a user is wearing the wearable article;
    an input device to receive a command input from the user, the input device being coextensive with or distinct from the sensor;
    a transmitter configured to transmit a signal to a user recognition and authentication subsystem of the vehicle, the signal indicating that the wearable article is worn by a user and is located at a position outside of and spaced apart from the vehicle, wherein the user recognition and authentication subsystem is configured to:
        first, pre-authenticate the user based on a first authentication factor that the user recognition and authentication subsystem detects when the user is located at a first position, outside of and spaced apart from the vehicle, and when the user is wearing the wearable article; and
        second, authenticate the user, based on a second authentication factor that the user recognition and authentication subsystem detects when the user is located at a second position, outside of and spaced apart from the vehicle, the second position being nearer to the vehicle than the first position;
    one or more processors; and
    a memory for storing data and program instructions executed by the one or more processors, wherein the one or more processors are configured to execute instructions stored in the memory to:
        receive a first input from a user to interpret the command input as indicating a vehicle function to be performed on a vehicle;
        receive a second input from the sensor indicating a gesture by the user for authentication; and
        generate a control signal to perform the vehicle function if the user has been pre-authenticated and authenticated.

12. The wearable article of claim 11, wherein the vehicle function is one of a remote control function, a driver score function, a panic mode function, a navigation function, an audio or video function, a climate control function, or an internet access function.

13. The wearable article of claim 12, wherein the remote control function is one of unlocking, locking, switching on flashlight, switching off flashlight, horn honk, starting, stopping, powering on, or powering off of the vehicle.

14. The wearable article of claim 11, further comprising:
a sensor configured to detect the gesture by the user and generate the second input based on the gesture.

15. The wearable article of claim 11, wherein the one or more processors are further configured to execute instructions stored in the memory to:
receive a driver score generated for at least one driver action associated with one or more vehicle functions performed by the user on the vehicle.

16. A method for operating a vehicle, the method comprising:
determining, using a sensor associated with a wearable article, that a user is located proximate to the vehicle and is wearing the wearable article;
pre-authenticating the user, based on a first authentication factor received when the user is located at a first position, outside of and spaced apart from the vehicle;
generating a display on a window of the vehicle in response to the pre-authentication, the display configured to be visible from the first position;
authenticating the user, after performance of the pre-authentication, based on a second authentication factor received when the user is located at a second position, outside of and spaced apart from the vehicle, the second position being nearer to the vehicle than the first position;
receiving, at the wearable article, a first input from the user indicating a vehicle function to be performed by the vehicle;
if the user has been pre-authenticated and authenticated, generating, at the wearable article, a control signal for performing the vehicle function.

17. The method of claim 16, wherein the vehicle function is one of a remote control function, a driver score function, a panic mode function, a navigation function, an audio or video function, a climate control function, or an internet access function.

18. The method of claim 17, wherein the remote control function is one of unlocking, locking, switching on flashlight, switching off flashlight, horn honk, starting, stopping, powering on, or powering off of the vehicle.

* * * * *